United States Patent
Kang et al.

(10) Patent No.: US 9,386,342 B2
(45) Date of Patent: Jul. 5, 2016

(54) DIGITAL DISPLAY DEVICE AND METHOD FOR CONTROLLING THE SAME

(71) Applicants: LG ELECTRONICS INC., Seoul (KR); SNU R&DB FOUNDATION, Seoul (KR)

(72) Inventors: Sungsuk Kang, Seoul (KR); Baeguen Kang, Seoul (KR); Yongho Cho, Seoul (KR); Hyunjoong Kim, Seoul (KR); Sungzoon Cho, Seoul (KR); Myunghwan Yun, Seoul (KR); Taehoon Ko, Seoul (KR); Eunjeong Park, Seoul (KR); Ilgeun Kwon, Seoul (KR); Chul Chung, Seoul (KR)

(73) Assignees: LG Electronics Inc., Seoul (KR); SNU R&DB Foundation, Seoul (KR)

(*) Notice: Subject to any disclaimer, the term of this patent is extended or adjusted under 35 U.S.C. 154(b) by 100 days.

(21) Appl. No.: 14/196,661

(22) Filed: Mar. 4, 2014

(65) Prior Publication Data
US 2014/0250477 A1    Sep. 4, 2014

(30) Foreign Application Priority Data

Mar. 4, 2013    (KR) ........................ 10-2013-0022837

(51) Int. Cl.
| | |
|---|---|
| *H04N 21/433* | (2011.01) |
| *H04N 21/4147* | (2011.01) |
| *H04N 21/422* | (2011.01) |
| *H04N 21/432* | (2011.01) |
| *H04N 21/4335* | (2011.01) |
| *H04N 21/442* | (2011.01) |
| *H04N 21/458* | (2011.01) |

(Continued)

(52) U.S. Cl.
CPC ....... *H04N 21/4334* (2013.01); *H04N 21/4147* (2013.01); *H04N 21/42222* (2013.01); *H04N 21/4325* (2013.01); *H04N 21/4335* (2013.01); *H04N 21/44204* (2013.01); *H04N 21/44222* (2013.01); *H04N 21/458* (2013.01); *H04N 21/4668* (2013.01); *H04N 21/4826* (2013.01)

(58) Field of Classification Search
CPC .......... H04N 21/4334; H04N 21/4147; H04N 21/42222; H04N 21/4325; H04N 21/44204; H04N 21/458; H04N 21/4668; H04N 21/4826
See application file for complete search history.

(56) References Cited

U.S. PATENT DOCUMENTS 5,852,705 A * 12/1998 Hanko et al. .................. 386/265
2002/0009283 A1    1/2002 Ichioka et al.

(Continued)

FOREIGN PATENT DOCUMENTS

| EP | 1 014 715 A2 | 6/2000 |
|---|---|---|
| EP | 2 267 708 A2 | 12/2010 |

*Primary Examiner* — Joshua Taylor
(74) *Attorney, Agent, or Firm* — Birch, Stewart, Kolasch & Birch, LLP

(57) ABSTRACT

A digital display device and a method for controlling the same are disclosed. The method of controlling a digital display device connected to at least one network and at least one memory includes receiving content (e.g., a TV program, etc.) over the at least one network, calculating memory capacity of an internal or external memory, storing the received content (e.g., a TV program, etc.) in the internal or external memory according to the calculated result, accessing the internal or external memory if a specific channel is selected, extracting the content (e.g., a TV program, etc.) stored in the accessed internal or external memory, and outputting video data and audio data corresponding to the extracted content (e.g., a TV program, etc.).

17 Claims, 24 Drawing Sheets

(51) Int. Cl.
*H04N 21/466* (2011.01)
*H04N 21/482* (2011.01)

(56) References Cited

U.S. PATENT DOCUMENTS

| | | |
|---|---|---|
| 2002/0124255 A1* | 9/2002 | Reichardt et al. ............... 725/42 |
| 2003/0088872 A1 | 5/2003 | Maissel et al. |
| 2005/0172318 A1 | 8/2005 | Dudkiewicz et al. |
| 2007/0199039 A1* | 8/2007 | Diroo et al. ................... 725/134 |
| 2009/0328104 A1* | 12/2009 | Jones et al. ..................... 725/46 |
| 2010/0138864 A1* | 6/2010 | Yoakum .......................... 725/44 |
| 2011/0164861 A1* | 7/2011 | Kunkel et al. ................ 386/343 |
| 2012/0296920 A1* | 11/2012 | Sahni et al. ................... 707/749 |

\* cited by examiner

FIG. 10

| DATA / CHANNEL NUMBER | GENRE | STORED TV PROGRAM | PRIORITY (date) |
|---|---|---|---|
| 00 - 1 | SPORTS | B PROGRAM | 2 (2012. 1. 5) |
| | | D PROGRAM | 1 (2012. 1. 7) |
| | | E PROGRAM | 3 (2012. 1. 1) |
| 00 - 2 | DRAMA | C PROGRAM | 2 (2012. 1. 2) |
| | | F PROGRAM | 1 (2012. 1. 10) |
| 00 - 3 | ENTERTAINMENT | A PROGRAM | 1 (2011. 12. 31) |

(a)　　　　　　　　　　　　　　(b)

FIG. 15
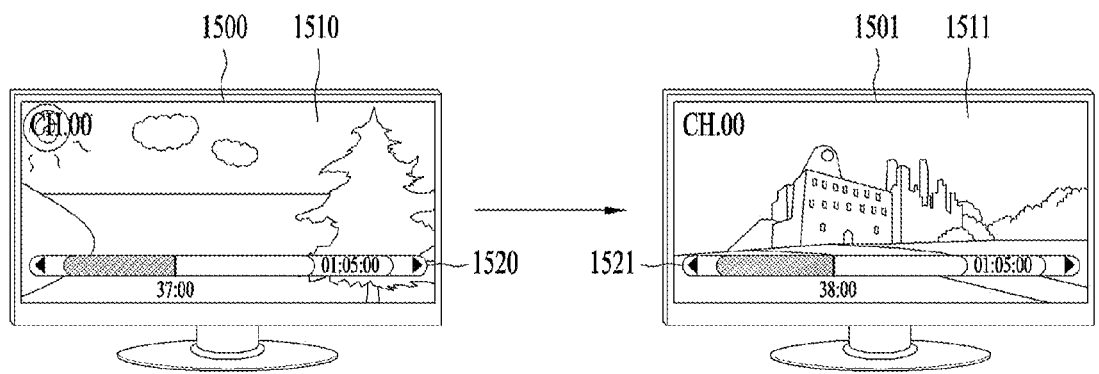
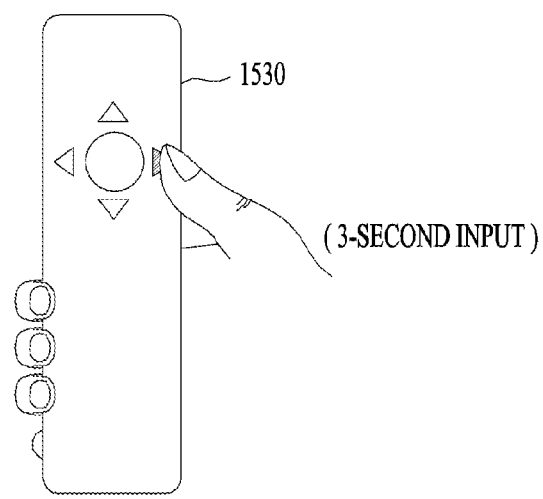
(3-SECOND INPUT)

FIG. 16
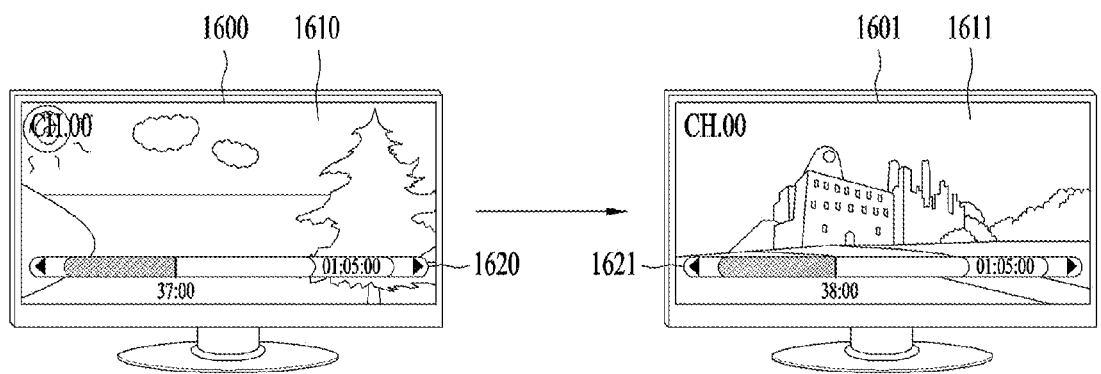
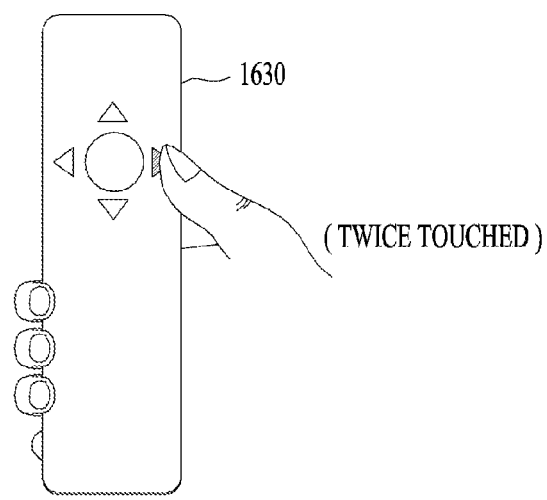
(TWICE TOUCHED)

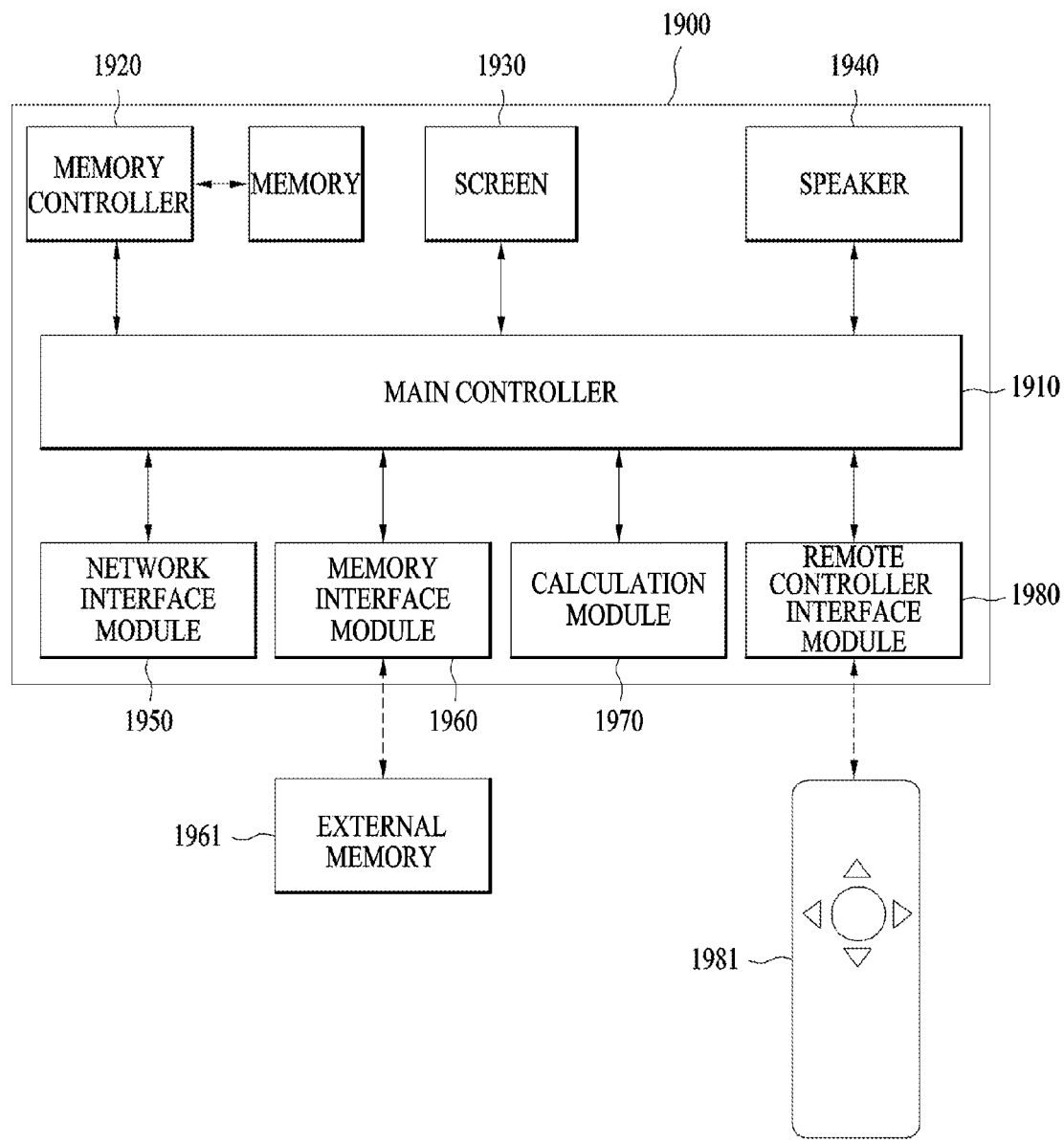

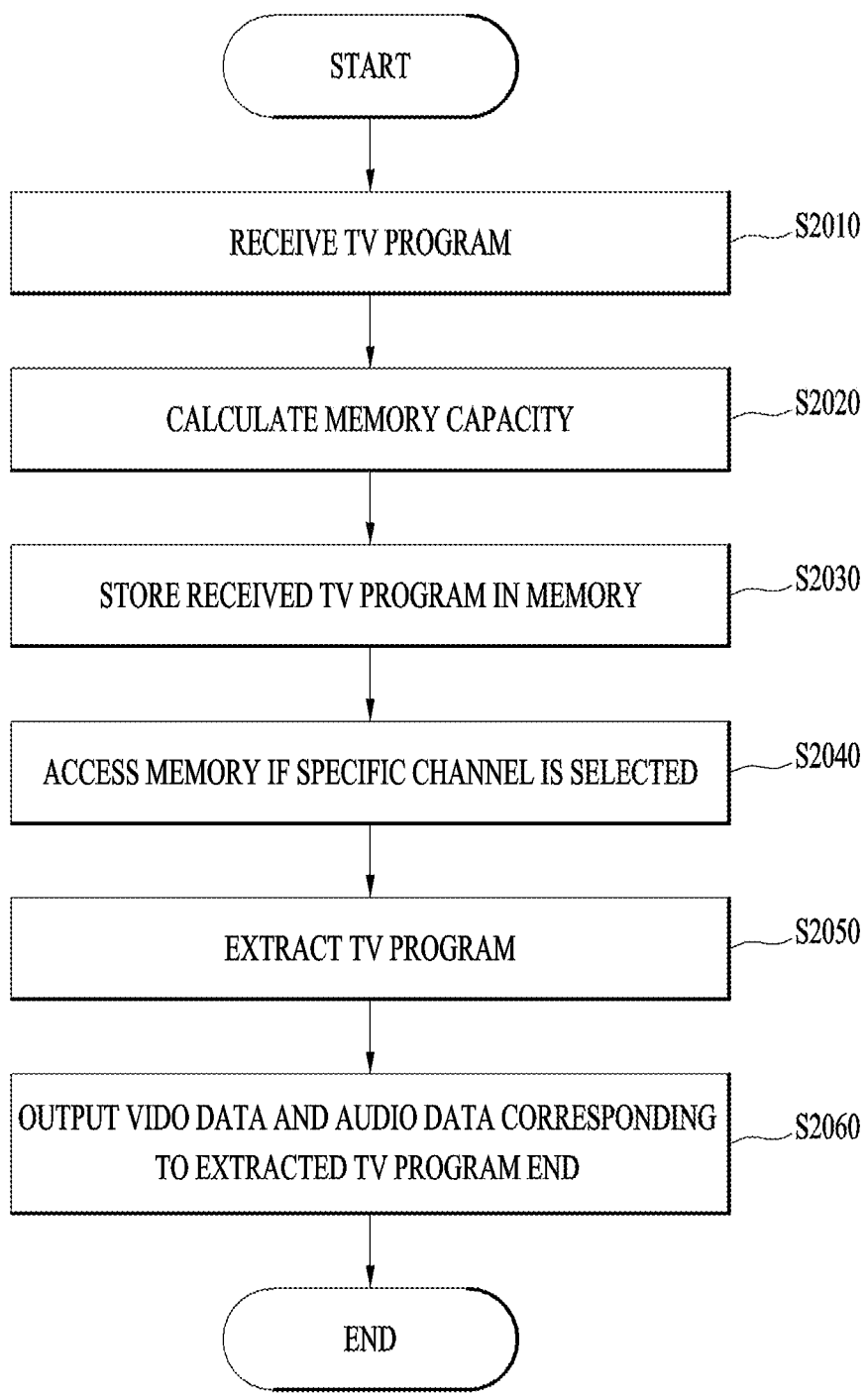

FIG. 21

| BROADCAST DATE | BROADCAST DAY OF WEEK | BROADCAST TITLE | RATINGS RANKING | RATINGS SCORE | DOWNLOAD RANKING | DOWNLOAD SCORE |
|---|---|---|---|---|---|---|
| 2011-01-01 | Sat | SPECIAL PROJECT <SECRET GARDEN> | 1 | 100 | 12 | 89 |

FIG. 22

| PROGRAM NAME | RATINGS SCORE | | DOWNLOAD SCORE | | DOWNLOAD SCORE - RATINGS SCORE | |
|---|---|---|---|---|---|---|
| | min | max | min | max | min | max |
| INFINITY CHALLENGE | 93 | 99 | 94 | 100 | -1 | 6 |
| DAILY SITCOM HIGH KICK 3 (THE REVENGE OF THE SHORT LEGGED) | 81 | 97 | 88 | 98 | -3 | 13 |
| WED / THU DRAMA DEEP ROOTED TREE | 83 | 100 | 62 | 94 | -36 | -1 |
| DAILY DRAMA SMILE AGAIN | 99 | 100 | 12 | 100 | -88 | 0 |
| WEEKEND DRAMA MY HUSBAND GOT A FAMILY | 100 | 100 | 51 | 96 | -36 | -1 |

| INPUT PARAMETER | BASIC SETTING |
|---|---|
| Popularity Index (PI) | — |
| NUMBER OF PIECES OF RECORDED CONTENT | MAXIMUM OF 6 |
| GENRE OF RECORDED PROGRAM | DRAMA, ENTERTAINMENT, CURRENT AFFAIRS/EDUCATION |
| MAXIMUM ALLOWABLE NUMBER OF SERIES | 1 |
| MAXIMUM NUMBER OF DAYS FOR STORING ONE PROGRAM | 4 DAYS |
| TIME UNIT CONSIDERING PI | DAILY INFORMATION IS USED |

|  | EXTERNAL MEMORY IS NOT CONNECTED X | EXTERNAL MEMORY IS CONNECTED O | | |
|---|---|---|---|---|
|  |  | 10GB | 20GB | 50GB |
| NUMBER OF PIECES RECORDED CONTENT | MAXIMUM OF 6 | 9 | 12 | 21 |
| MAXIMUM ALLOWABLE NUMBER OF SERIES | 1 | 1 | 2 | 3 |
| MAXIMUM NUMBER OF DAYS FOR STORING PROGRAM | 4 DAYS | 5 | 6 | 7 |

FIG. 27

| EPG INFORMATION | |
| --- | --- |
| CHANNEL NUMBER | BROADCAST STATION |
| 1 | MBS |
| 2 | KBC |
| 4 | TBS |
| 5 | CNM |
| 7 | BBB |
| ⋮ | ⋮ |

FIG. 28

| DataBase | |
|---|---|
| CHANNEL NUMBER | BROADCAST STATION |
| 1 | MBS |
| 2 | KBC |
| 3 | TIME MACHINE CHANNEL — 2801 |
| 4 | TBS |
| 5 | CNM |
| 6 | TIME MACHINE CHANNEL — 2802 |
| 7 | BBB |
| ⋮ | ⋮ |

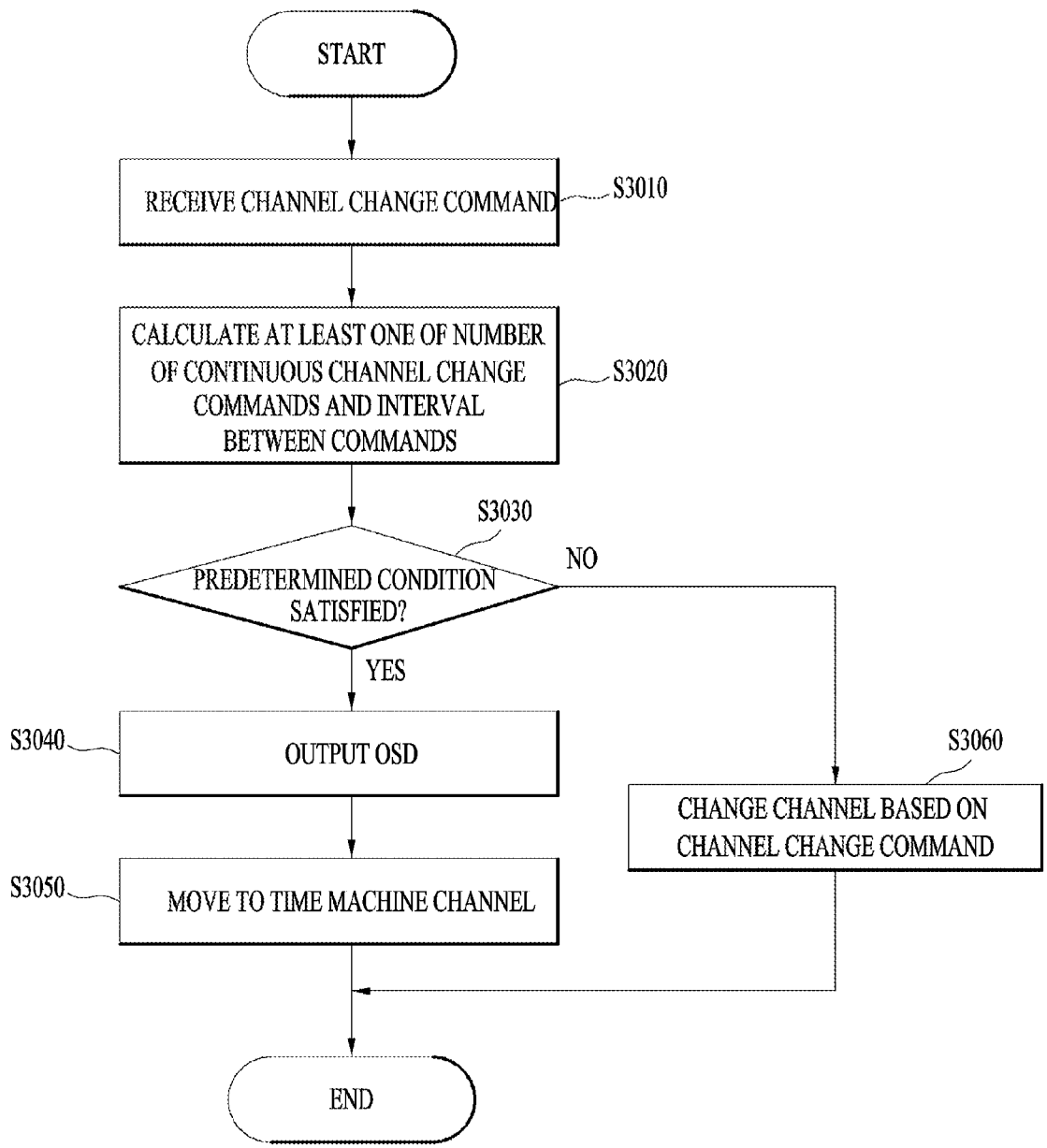

DIGITAL DISPLAY DEVICE AND METHOD FOR CONTROLLING THE SAME

This application claims the benefit of Korean Patent Application No. 10-2013-0022837, filed on Mar. 4, 2013, which is hereby incorporated by reference as if fully set forth herein.

BACKGROUND OF THE INVENTION

1. Field of the Invention

The present invention relates to a digital display device and a method for controlling the same, and more particularly, to a technique applicable to a television (e.g., an Internet Protocol Television (IPTV), a smart TV, a Digital Television (DTV), etc.) or a set-top box (STB).

2. Discussion of the Related Art

Recently, with technological development, a digital display device capable of being connected to at least one network or external memory has appeared. A smart TV, which is also referred to as an Internet TV or a connected TV, is one example of such a digital display device.

The smart TV may download content from the Internet in real time and output news/weather/email anytime. In addition, the smart TV may include a mass memory and freely perform data communication with an external memory/device.

According to the current technique, a variety of content (e.g., content such as a TV program, etc.) may be manually or automatically stored in a memory but user adoption of such function is low. For example, a method of accessing recorded content is significantly complicated and is time-consuming.

Further, according to the current technique, a service for selectively providing only content desired by a user among several tens or hundreds of pieces of content is not provided.

SUMMARY OF THE INVENTION

Accordingly, the present invention is directed to a digital display device and a method for controlling the same that substantially obviate one or more problems due to limitations and disadvantages of the related art.

An object of the present invention is to shorten a time for accessing pre-stored content (e.g., content such as a TV program, etc.) and to improve a data processing speed. In addition, a solution for maximizing user convenience is defined.

Another object of the present invention is to provide a database for more efficiently managing pre-stored content (e.g., content such as a TV program, etc.). Further, another object of the present invention is to provide a technique of optimizing a storage list of preferred content of a user according to the status of an internal memory and an external memory.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a digital display device connected to at least one network includes a remote controller interface module configured to receive a channel selection command from a remote controller, a network interface module configured to receive first content (e.g., a TV program, etc.) over the at least one network if a first channel is selected, a processor configured to process video data and audio data corresponding to the received first content (e.g., a TV program, etc.), a screen configured to output the processed video data, a speaker configured to output the processed audio data, a memory configured to store at least one piece of content (e.g., a TV program, etc.), a memory controller configured to access the memory if a second channel is selected, and a main controller configured to extract second content (e.g., a TV program, etc.) stored in the accessed memory and to control the processor, the screen and the speaker to process and output video data and audio data corresponding to the extracted second content (e.g., a TV program, etc.).

In another aspect of the present invention, a method for controlling a digital display device connected to at least one network includes receiving a channel selection command from a remote controller, receiving first content (e.g., a TV program, etc.) over the at least one network if a first channel is selected, outputting video data and audio data corresponding to the received first content (e.g., a TV program, etc.), storing at least one piece of content (e.g., a TV program, etc.) in an internal or external memory, accessing the internal or external memory if a second channel is selected, extracting second content (e.g., a TV program, etc.) stored in the accessed internal or external memory, and outputting video data and audio data corresponding to the extracted second content (e.g., a TV program, etc.).

In another aspect of the present invention, a digital display device connected to at least one network and at least memory includes a network interface module configured to receive content (e.g., a TV program, etc.) over the at least one network, a memory interface module configured to perform data communication with an external memory, a calculation module configured to calculate memory capacity of an internal memory and the external memory, a main memory configured to store the received content (e.g., a TV program, etc.) in the internal or external memory according to the calculated result, a remote controller interface module configured to receive a channel selection command from a remote controller, a memory controller configured to access the internal or external memory if a specific channel is selected via the remote controller interface module, a screen configured to output video data corresponding to the content (e.g., a TV program, etc.) stored in the accessed internal or external memory and a speaker configured to output audio data corresponding to the content (e.g., a TV program, etc.) stored in the accessed internal or external memory.

In another aspect of the present invention, a method for controlling a digital display device connected to at least one network and at least memory includes receiving content (e.g., a TV program, etc.) over the at least one network, calculating memory capacity of an internal memory or an external memory, storing the received content (e.g., a TV program, etc.) in the internal or external memory according to the calculated result, accessing the internal or external memory if a specific channel is selected, extracting the content (e.g., a TV program, etc.) stored in the accessed internal or external memory, and outputting video data and audio corresponding to the extracted content (e.g., a TV program, etc.).

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 10 is a diagram showing specific channel related data stored in a memory of a digital display device according to one embodiment of the present invention;

FIG. 15 is a diagram illustrating an example of editing playback of recorded content provided via a specific channel by a digital display device according to one embodiment of the present invention;

FIG. 16 is a diagram illustrating another example of editing playback of recorded content provided via a specific channel by a digital display device according to one embodiment of the present invention;

FIG. 19 is a block diagram showing a digital display device according to another embodiment of the present invention;

FIG. 20 is a flowchart illustrating a method for controlling a digital display device according to another embodiment of the present invention;

FIG. 21 is a diagram showing supplementary information of specific content stored in an integrated database according to another embodiment of the present invention;

FIG. 22 is a diagram showing a plurality of pieces of content-related supplementary information stored in an integrated database according to another embodiment of the present invention;

FIGS. 27 and 28 are diagrams illustrating an example of a channel change process according to another embodiment of the present invention; and FIGS. 29 and 30 are diagrams illustrating another example of a channel change process according to another embodiment of the present invention.

DETAILED DESCRIPTION OF THE INVENTION

Hereinafter, the present invention will be described in detail with reference to the accompanying drawings.

The terms "module" and "unit" attached to describe the names of components are used herein to aid in the understanding of the components and thus they should not be considered as having specific meanings or roles. Accordingly, the terms "module" and "unit" may be used interchangeably.

A digital display device described in the preset specification may be an intelligent digital display device equipped with a computer support function in addition to a broadcast reception function, for example. Thus the digital display device may have user-friendly interfaces such as a handwriting input device, a touchscreen, a touch pad or a pointing device. Further, because the digital display device supports wired or wireless Internet, it is capable of e-mail transmission/reception, Web browsing, banking, gaming, etc. by connecting to the Internet or a computer. To implement these functions, the digital display device may operate based on a standard general-purpose Operating System (OS).

Accordingly, various applications can be freely added to or deleted from, for example, a general-purpose OS kernel in the digital display device according to the present invention. Therefore, the digital display device may perform a number of user-friendly functions. The digital display device may be an Internet TV, an Internet Protocol Television (IPTV), a network TV, a Hybrid broadcast broadband TV (HbbTV), a smart TV, an open hybrid TV (OHTV), etc. The digital display device is applicable to a smart phone, a personal computer (PC) or an electronic device, as needed.

Embodiments of the present invention will be described in detail with reference to the attached drawings, but it should be understood that they are merely illustrative of the present invention and should not be interpreted as limiting the scope of the present invention.

Although the terms used in the present disclosure are selected from generally known and used terms, terms used herein may be varied depending on operator's intention or customs in the art, appearance of a new technology, or the like. In addition, some of the terms mentioned in the description of the present disclosure have been selected by the applicant at his or her discretion, the detailed meanings of which are described in relevant parts of the description herein. Furthermore, the present disclosure must be understood, not simply by the actual terms used but by the meanings of each term lying within.

In the present specification, for convenience of description, a "remote controller" and "remote" are used interchangeably but have the same meaning unless stated otherwise.

Figure 1:
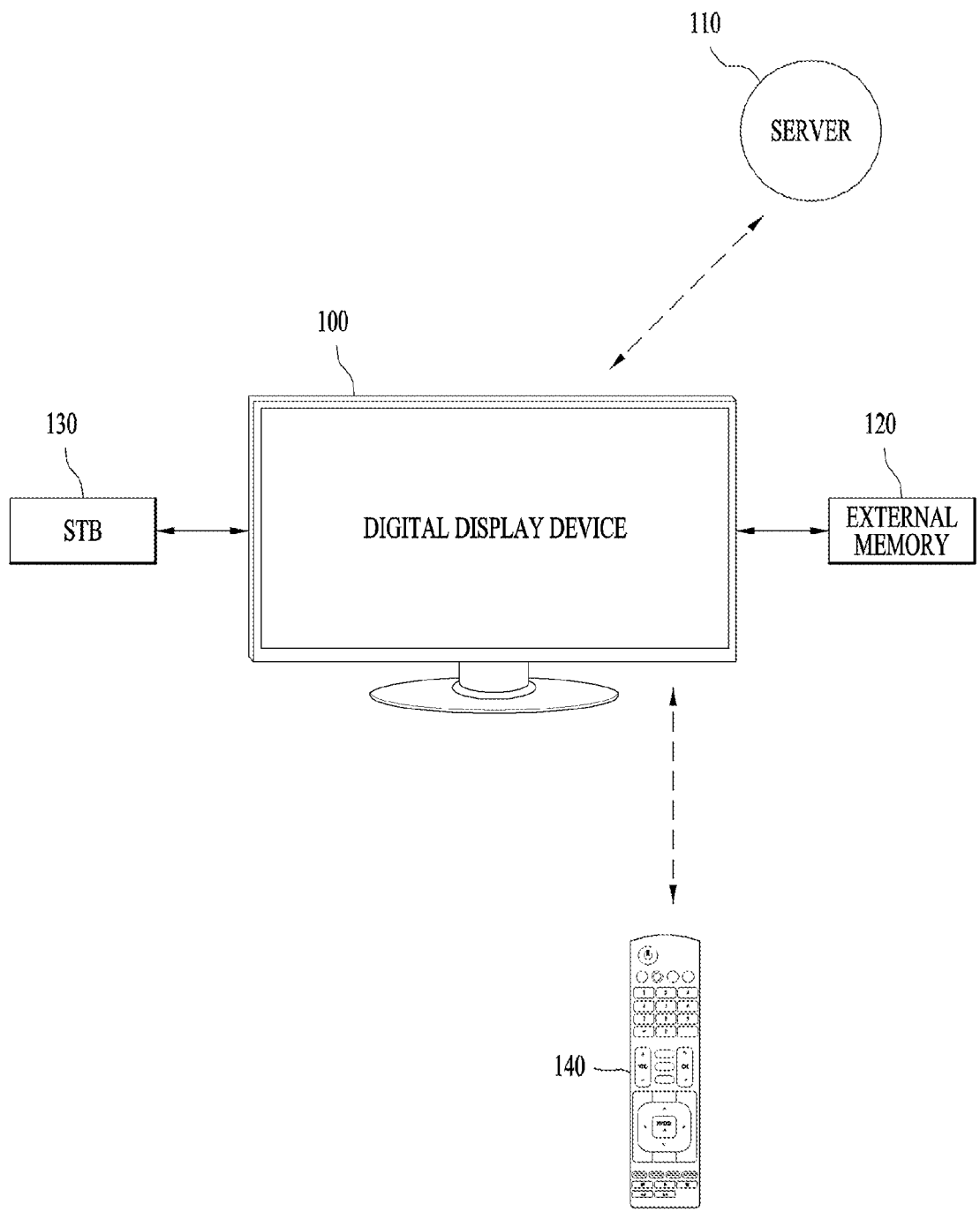
FIG. 1 is a schematic diagram showing an overall system according to one embodiment of the present invention.

FIG. 1 is a schematic diagram showing an overall system according to one embodiment of the present invention. Hereinafter, the overall system according to the embodiment of the present invention will be described with reference to FIG. 1. Although one embodiment and another embodiment of the present invention are used in the present specification, FIG. 1 is applicable to another embodiment which will be described with reference to FIGS. 18 to 26. Further, the scope of the present invention is not limited to the components shown in FIG. 1 and the patent should be interpreted according to the scope of the claims.

First, as shown in FIG. 1, the overall system includes a digital display device 100, a server 110, an external memory 120, a set-top box (STB) 130 and a remote controller 140. In particular, the digital display device 100 will be described in greater detail with reference to FIGS. 2, 3, 6 and 19. In addition, the remote controller 140 will be described in greater detail with reference to FIGS. 4 and 5.

The digital display device 100 according to one embodiment of the present invention has a function for automatically or manually recording content (e.g., content such as a TV program, etc.). The content is received from the server 110 or the STB 130.

Further, the content received from the server 110 or the STB 130 may be stored in an internal memory or an external memory 120 of the digital display device 100.

The server may be designed to manage supplementary information of a variety of content and a server which serves as an integrated database will be described in greater detail with reference to FIG. 18.

Various functions of the digital display device 100 may be controlled using the remote controller 140. The remote controller 140 may include one or more key buttons, a touch sensor or a motion recognition sensor, etc., for example.

Figure 2:
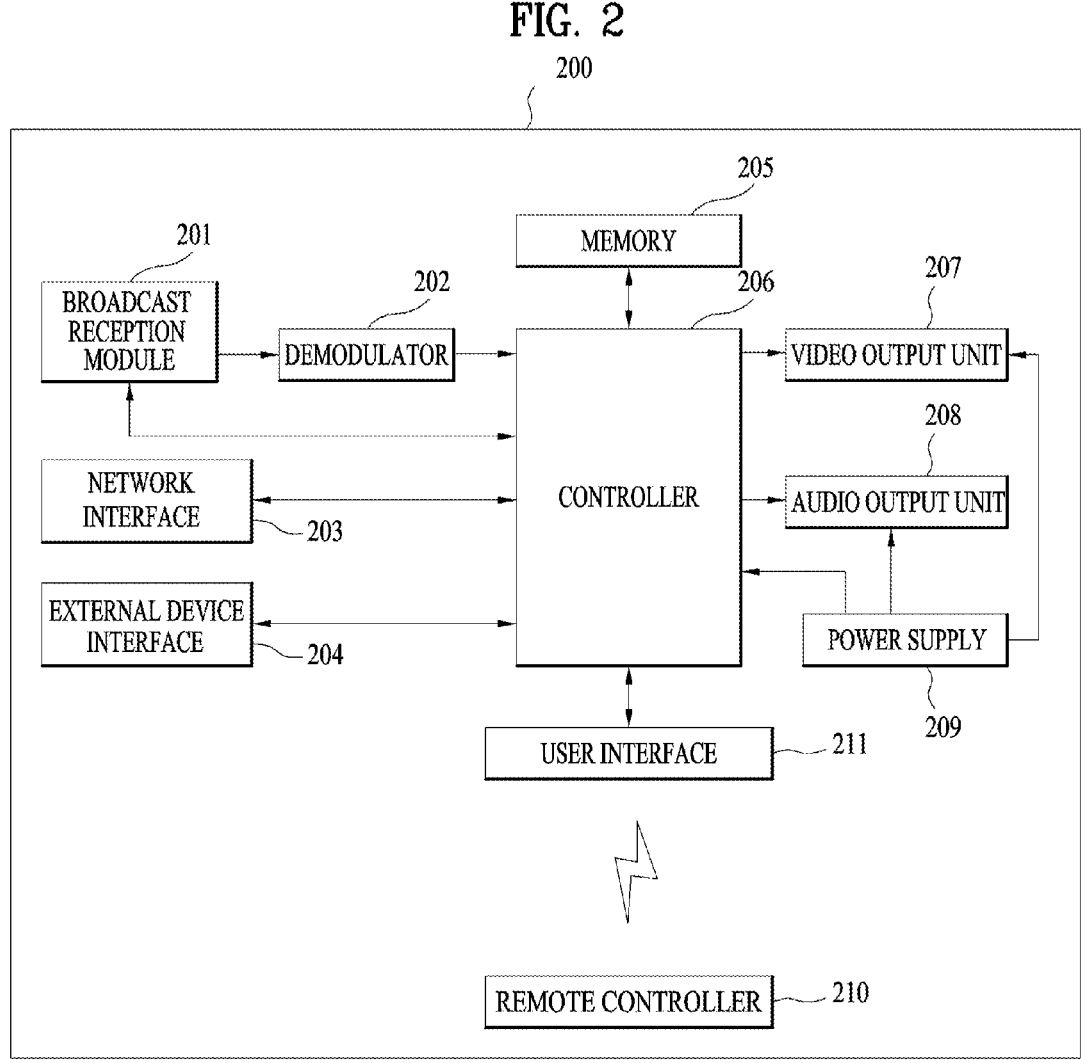
FIG. 2 is a block diagram showing components of a digital display device shown in FIG. 1.

FIG. 2 is a block diagram showing components of a digital display device shown in FIG. 1. The digital display device 200 shown in FIG. 2 will be described with reference to the description of the digital display device 100 shown in FIG. 1. Further, FIGS. 6 and 19 may be changed with reference to FIG. 2 within the scope of the present invention.

As shown in FIG. 2, the digital display device 200 according to one embodiment of the present invention includes a broadcast reception module 201, a demodulator 202, a network interface 203, an external device interface 204, a memory 205, a controller 206, a video output unit 207, an audio output unit 208, a power supply 209 and a user interface 211. The digital display device 200 is designed to perform data communication with the remote controller and the remote controller will be described in greater detail below with reference to FIGS. 4 and 5.

The broadcast reception module 201 may be designed as a radio frequency (RF) tuner or an interface for receiving broadcast data from an external device such as an STB, for example.

The broadcast reception module 201 may receive an RF broadcast signal from an Advanced Television Systems Committee (ATSC) single-carrier system or from a Digital Video Broadcasting (DVB) multi-carrier system.

The demodulator 202 receives the digital IF (DIF) signal from the broadcast reception module 201 and demodulates the DIF signal.

For example, if the DIF signal output from the broadcast reception module 201 is an ATSC signal, the demodulator 202 may perform 8-vestigal sideband (VSB) demodulation on the DIF signal. The demodulator 202 may also perform channel decoding.

The external device interface 204 may serve as an interface for performing data communication between an external device and the digital display device 200. The external device interface 204 may be connected to an external device such as a digital versatile disc (DVD) player, a Blu-ray player, a game console, a camera, a camcorder, a computer (e.g., a laptop computer) or an STB, wirelessly or by wire. Then, the external device interface 204 externally receives video, audio, and/or data signals from the external device and transmits the received input signals to the controller 206. In addition, the external device interface 204 may output video, audio, and data signals processed by the controller 206 to the external device.

The external device interface 204 may include a Universal Serial Bus (USB) port, a Composite Video Banking Sync (CVBS) port, a Component port, a Super-video (S-video) (analog) port, a Digital Visual Interface (DVI) port, a High-Definition Multimedia Interface (HDMI) port, a Red-Green-Blue (RGB) port, and a D-SUB port.

The network interface 203 serves as an interface for connecting the digital display device 200 and a wired/wireless network such as the Internet. The network interface 203 may include an Ethernet port for connection to a wired network. For connection to wireless networks, the network interface 203 may use Wireless Local Area Network (WLAN) (i.e., Wi-Fi), Wireless Broadband (WiBro), World Interoperability for Microwave Access (WiMax), and High Speed Downlink Packet Access (HSDPA).

The network interface 203 may transmit data to or receive data from another user or electronic device over a connected network or another network linked to the connected network.

The memory 205 may store various programs necessary for the controller 206 to process and control signals, and may also store processed video, audio and data signals. The memory 205 may temporarily store a video, audio and/or data signal received from the external device interface 204 or the network interface 203. The memory 205 may store various OSs, middleware and platform, for example.

The user input interface 211 transmits a signal received from the user to the controller 206 or transmits a signal received from the controller 206 to an external device (e.g., the remote controller 210). For example, the user input interface 211 may receive control signals such as a power-on/off signal, a channel selection signal, and a screen setting signal from a remote controller 210 or may transmit a signal received from the controller 206 to the remote controller 210, according to various communication schemes, for example, RF communication and IR communication.

The controller 206 may demultiplex the stream signal received from the broadcast reception module 201, the demodulator 202, the network interface 203 or the external device interface 204 into a number of signals and process the demultiplexed signals into audio and video data. The controller 206 will be described in greater detail below with reference to FIG. 3.

The video output unit 207 may convert a processed video signal, a processed data signal, and an OSD signal received from the controller 206 or a video signal and a data signal received from the external device interface 204 into RGB signals, thereby generating driving signals. The video output unit 207 may be various types of displays such as a Plasma Display Panel (PDP), a Liquid Crystal Display (LCD), an Organic Light-Emitting Diode (OLED) display, a flexible display, and a 3D display.

The audio output unit 208 may receive a processed audio signal (e.g., a stereo signal, a 3.1-channel signal or a 5.1-channel signal) from the controller 206 and output the received audio signal as sound. The audio output unit 206 may be implemented as various speakers.

The power supply 209 supplies power to the digital display device 200. Particularly, the power supply 209 may supply power to the controller 206, the video output unit 207, and the audio output unit 208, which may be implemented as a System on Chip (SOC).

Figure 3:
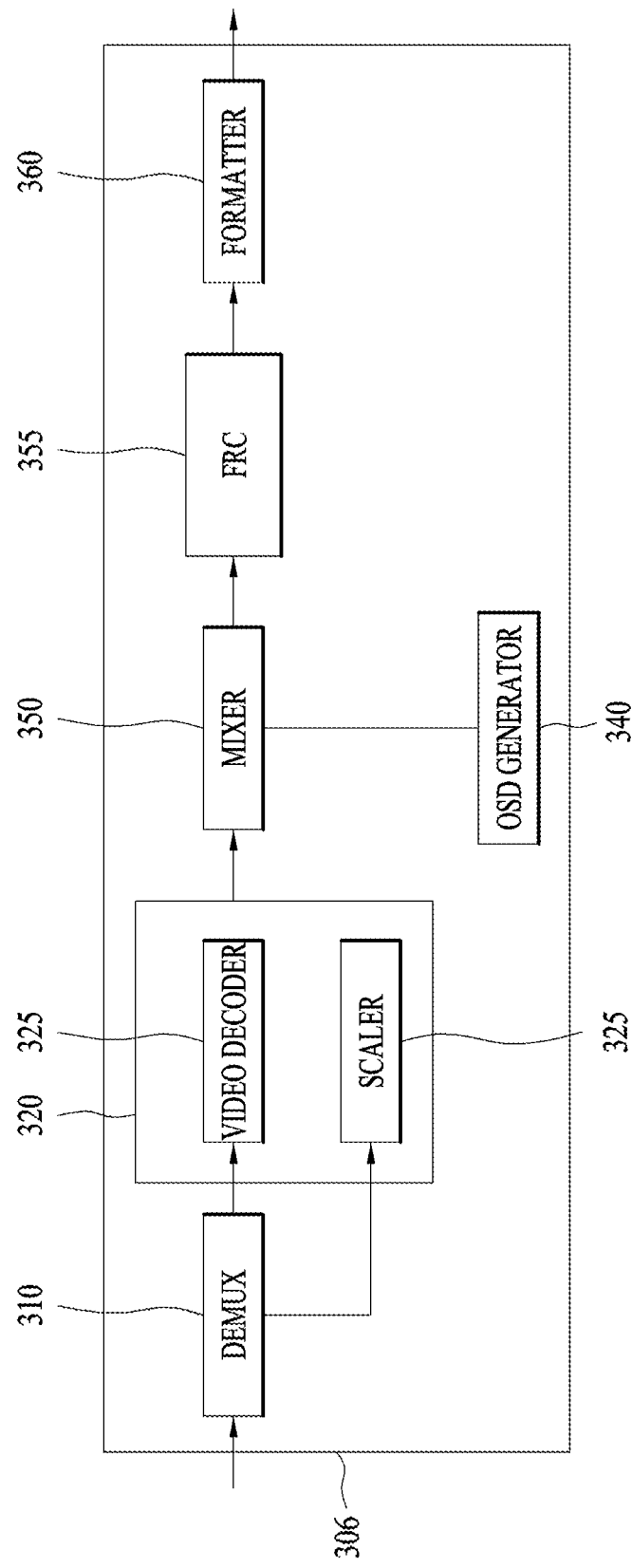
FIG. 3 is a block diagram showing a controller shown in FIG. 2 in detail.

FIG. 3 is a block diagram showing a controller shown in FIG. 2 in detail.

As shown in FIG. 3, the controller 306 of the digital display device may include a DEMUX 310, a video processor 320, an OSD generator 340, a mixer 350, a Frame Rate Converter (FRC) 355, and a formatter 360. The controller 306 may further include an audio processor (not shown) and a data processor (not shown).

The DEMUX 310 demultiplexes an input stream. For example, the DEMUX 310 may demultiplex an MPEG-2 TS into a video signal, an audio signal, and a data signal.

The video processor 320 may process the demultiplexed video signal. For video signal processing, the video processor 320 may include a video decoder 325 and a scaler 335. The video decoder 325 decodes the demultiplexed video signal and the scaler 335 scales the resolution of the decoded video signal so that the video signal can be displayed on the video output unit. The video signal decoded by the video processor 320 is provided to the mixer 350.

The OSD generator 340 generates an OSD signal autonomously or according to user input. The mixer 350 may mix the decoded video signal processed by the image processor 320 with the OSD signal generated by the OSD generator 340.

The mixed signal is provided to the formatter 360. As the decoded broadcast video signal or the external input signal is mixed with the OSD signal, an OSD may be overlaid on the broadcast image or the external input image.

The FRC 355 may change the frame rate of an input image. For example, a frame rate of 60 Hz is converted into a frame rate of 120 or 240 Hz.

The formatter 360 changes the format of the signal received from the FRC 355 to be suitable for the video output unit. For example, the formatter 360 may output an RGB data signal. The RGB data signal may be output in the form of a Low Voltage Differential Signal (LVDS) or mini-LVDS.

Figure 4:
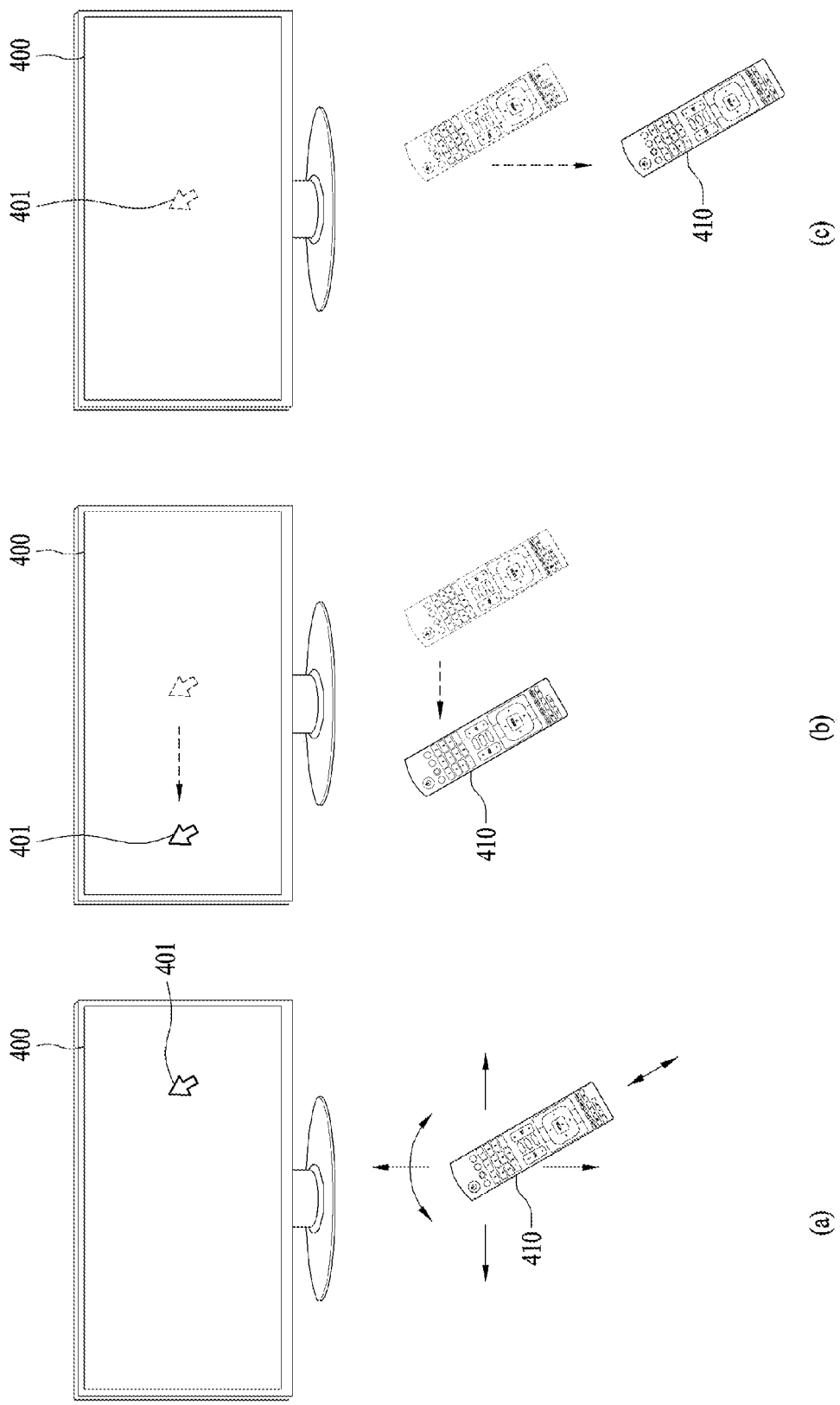
FIG. 4 is a diagram showing appearance of a remote controller according to one embodiment of the present invention.

FIG. 4 is a diagram showing appearance of a remote controller according to one embodiment of the present invention.

As shown in FIG. 4a, a pointer 401 corresponding to movement of a remote controller 410 is displayed on a screen of a digital display device 400. A user may move or rotate the remote controller 410 side to side (FIG. 4b) and up and down (FIG. 4c). Since the pointer 401 moves according to movement of the remote controller 410 in a 3D space, the remote controller 410 may be referred to as a pointing device.

As shown in FIG. 4b, when the user moves the remote controller 410 to the left, the pointer 401 displayed on the screen of the digital display device 400 also moves to the left. Meanwhile, information about movement of the remote controller 410 detected via a sensor of the remote controller 410 is transmitted to the digital display device 400. The digital display device 400 may calculate coordinates of the pointer 401 from the information about the movement of the remote controller 410. The digital display device 400 is designed to display the pointer 401 in correspondence with the calculated coordinates.

As shown in FIG. 4c, when the user moves the remote controller 410 downward, the pointer 401 displayed on the screen of the digital display device 400 also moves downward.

Accordingly, a specific area of the screen of the digital display device 400 may be rapidly selected using the remote controller 410 according to one embodiment of the present invention.

Figure 5:
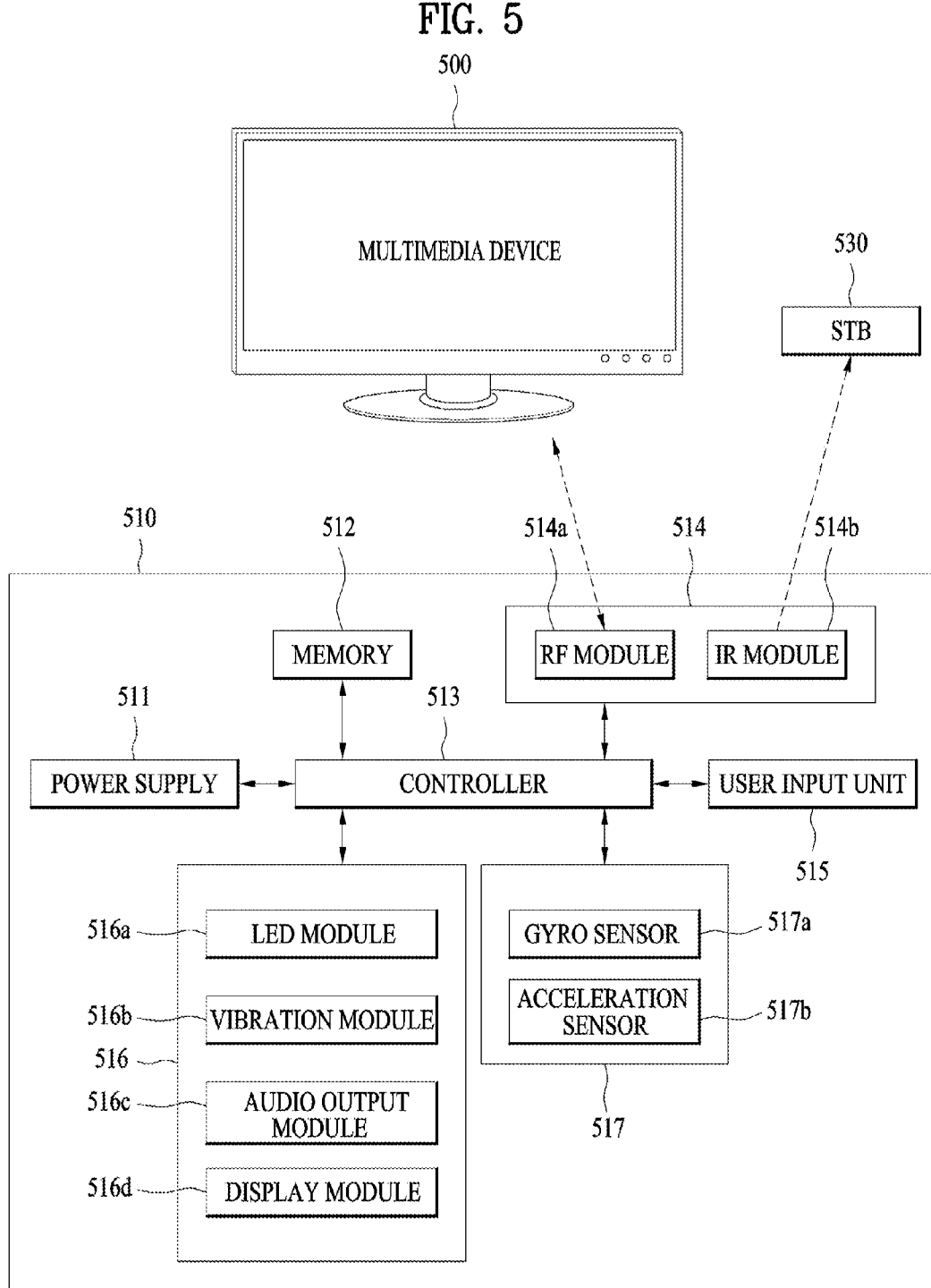
FIG. 5 is a block diagram showing components of a remote controller shown in FIG. 4 in detail.

FIG. 5 is a block diagram showing components of a remote controller shown in FIG. 4 in detail.

As shown in FIG. 5, the remote controller 510 includes a wireless communication unit 514, a user input unit 515, a sensor unit 517, an output unit 516, a power supply 511, a memory 512 and a controller 513.

The wireless communication unit 514 is designed to perform communication with an arbitrary external device. In particular, according to one embodiment of the present invention, an RF module 514a is designed to perform data communication with the digital display device 500 and an IR module 514b is designed to perform infrared communication with an external electronic device 530 (e.g., an STB).

Accordingly, the remote controller 510 may be implemented as a repeater for forwarding an IR code value received from the digital display device 500 to the STB 530.

Further, according to one embodiment of the present invention, the remote controller 510 transmits a signal containing information about movement of the remote controller 510 to the digital display device 500 via the RF module 514a.

In addition, the remote controller 510 may receive a signal transmitted by the digital display device 500 via the RF module 514a. In addition, the remote controller 510 may transmit a command for power on/off, channel change and volume change to the digital display device 500 via the IR module 514b as necessary.

The user input unit 515 may include a keypad, a touch pad or a touchscreen.

The sensor unit 517 may include a gyro sensor 517a and/or an acceleration sensor 517b. The gyro sensor 517a may sense movement of the remote controller 510. For example, the gyro sensor 517a may sense the movement of the remote controller 510 in X-, Y-, and Z-axis directions. The acceleration sensor 517b may sense the speed of the remote controller 510. In addition, a distance measurement sensor may be further included, which may sense a distance from the digital display device 500.

The output unit 516 may output a video and/or audio signal corresponding to manipulation of the user input unit 515 or corresponding to a signal received from the digital display device 500. For example, the output unit 516 may include a Light Emitting Diode (LED) module 516a1 which is turned on whenever the user input unit 515 is manipulated or whenever a signal is received from or transmitted to the digital display device 500 through the wireless communication unit 514, a vibration module 516b which generates vibrations, an audio output module 516c which outputs audio data, and/or a display module 516d which outputs video data.

The power supply 511 supplies power to the components of the remote controller 510. If the remote controller 510 is kept stationary for a predetermined time or longer, the power supply 511 may, for example, shut off supply of power to the remote controller 510 in order to save energy.

The memory 512 may store various types of programs and application data necessary to control or drive the remote controller 510. The controller 513 provides overall control to the remote controller 510. The controller 513 may transmit a signal corresponding to a key manipulation detected from the user input unit 515 or a signal corresponding to the motion of the remote controller 510, as sensed by the sensor unit 517, to the digital display device 500 or the STB 530 via the wireless communication unit 514.

The digital display device 500 shown in FIG. 5 may be referred to as a multimedia device and may include all the components of the remote controller 510 of FIG. 5, to which the present scope of the present invention is not limited.

Figure 6:
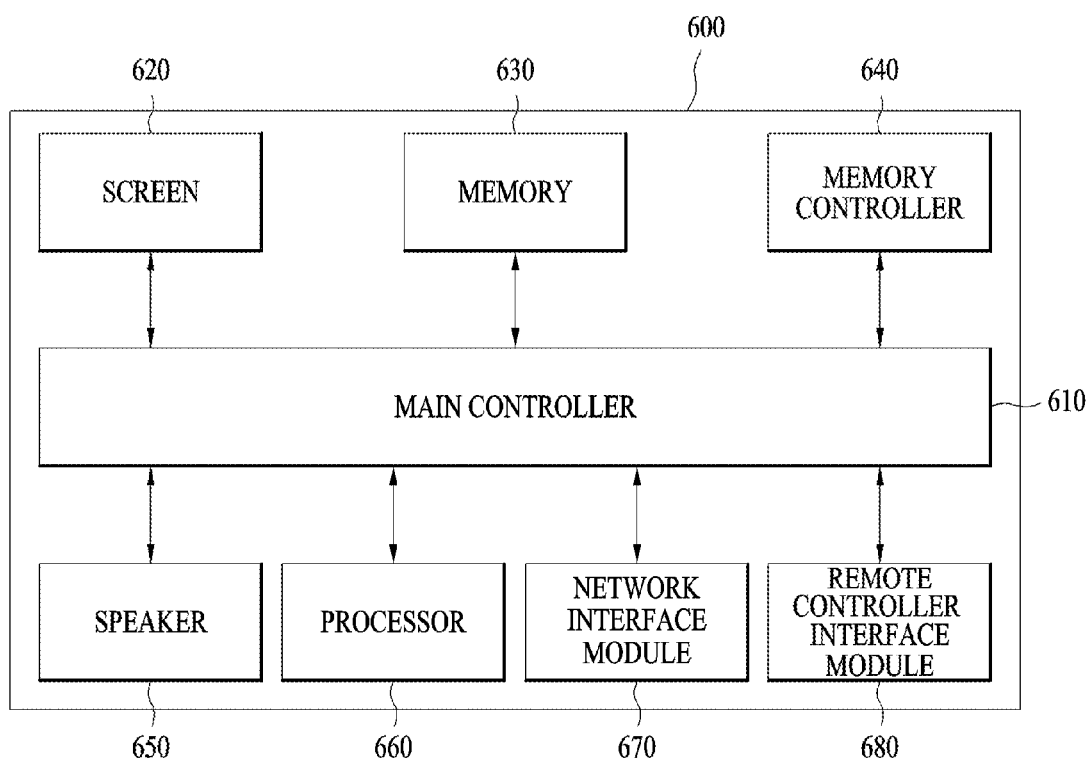
FIG. 6 is a block diagram showing a digital display device according to one embodiment of the present invention.

FIG. 6 is a block diagram showing a digital display device according to one embodiment of the present invention. Hereinafter, a technique of automatically detecting and providing pre-stored content when selecting a specific channel will be described with reference to FIG. 6.

As shown in FIG. 6, the digital display device according to one embodiment of the present invention includes a main controller 610, a screen 620, a memory 630, a memory controller 640, a speaker 650, a processor 660, a network interface module 670 and a remote controller interface module 680. Of course, some modules may be added or deleted as necessary.

The remote controller interface module 680 is designed to receive a channel selection command from the remote controller.

The network interface module 670 receives first content (e.g., a TV program, etc.) via at least one network if a first channel is selected. The content (e.g., a TV program, etc.) is received from a broadcast station or a content provider (CP), for example, and other content is applicable to the present invention.

The processor 660 processes video data and audio data corresponding to the received first content (e.g., a TV program, etc.), the screen 620 outputs the processed video data and the speaker 650 outputs the processed audio signal.

The memory 630 is designed to store at least one piece of content (e.g., a TV program, etc.). The at least one content (e.g., a TV program, etc.) may be automatically or manually stored.

If a second channel is selected, the memory controller 640 is designed to access the memory 630. Meanwhile, the second channel means a channel newly defined according to one embodiment of the present invention. That is, the second channel is generally distinguished from a channel number provided by a broadcast station and pre-stored content (e.g., a TV program, etc.) is immediately displayed or a list of pre-stored content is displayed when the second channel is selected. Accordingly, the user can reduce a complicated procedure for accessing pre-stored content and improve a data processing speed. Further, the second channel may be designed to correspond to Number 00 (a channel number which is not used by a broadcast station) or may be changed to an arbitrary number by a user. The second channel may be divided to generate a channel group corresponding to pre-stored content per category. For example, there are a channel number 00-1 for outputting a list of content belonging to a sports genre among pre-stored content, a channel number 00-2 for outputting a list of content belonging to a drama genre among the pre-stored content and a channel number 00-3 for outputting a list of content belonging to an entertainment genre among pre-stored content.

The main controller 610 is designed to control the processor 660, the screen 620 and the speaker 650 to extract second content (e.g., a TV program, etc.) stored in the accessed memory 630 and process and output video and audio data corresponding to the extracted second content (e.g., a TV program, etc.).

If the second channel is selected, the main controller 610 may be designed to control the memory controller 640 and the screen 620 to output a list for identifying a plurality of pieces of content (e.g., TV programs, etc.) stored in the memory 630. Further, the plurality of pieces of content (e.g., TV programs, etc.) is not received from the second channel. That is, in one embodiment of the present invention, when a newly defined second channel (e.g., a channel number 00) is selected, a method of automatically outputting specific content (e.g., a TV program, etc.) of the stored content (e.g., TV programs, etc.) may be employed or a method of displaying a list of stored content (e.g., TV programs, etc.) may be employed. In other words, the second channel functions as a virtual channel regardless of the broadcast channel. Accordingly, the user can easily access pre-stored content, which has not been recognized, during channel surfing.

If the output of the video and audio data corresponding to the second content (e.g., a TV program, etc.) is completed, the main controller 610 is designed to control the screen 620 to display supplementary information related to the second content (e.g., a TV program, etc.). This will be described with reference to FIGS. 12 and 17.

The supplementary information includes at least one of broadcast schedule information, channel information, etc. of content (e.g., a TV program, etc.) related to the second content (e.g., a TV program, etc.).

If the second channel is selected, the main controller 610 is designed to temporarily stop the function of the network interface module 670. As described above, since data is not received from an external network upon selection of the second channel, an unnecessary networking function may be temporarily stopped to improve energy consumption efficiency.

Figure 7:
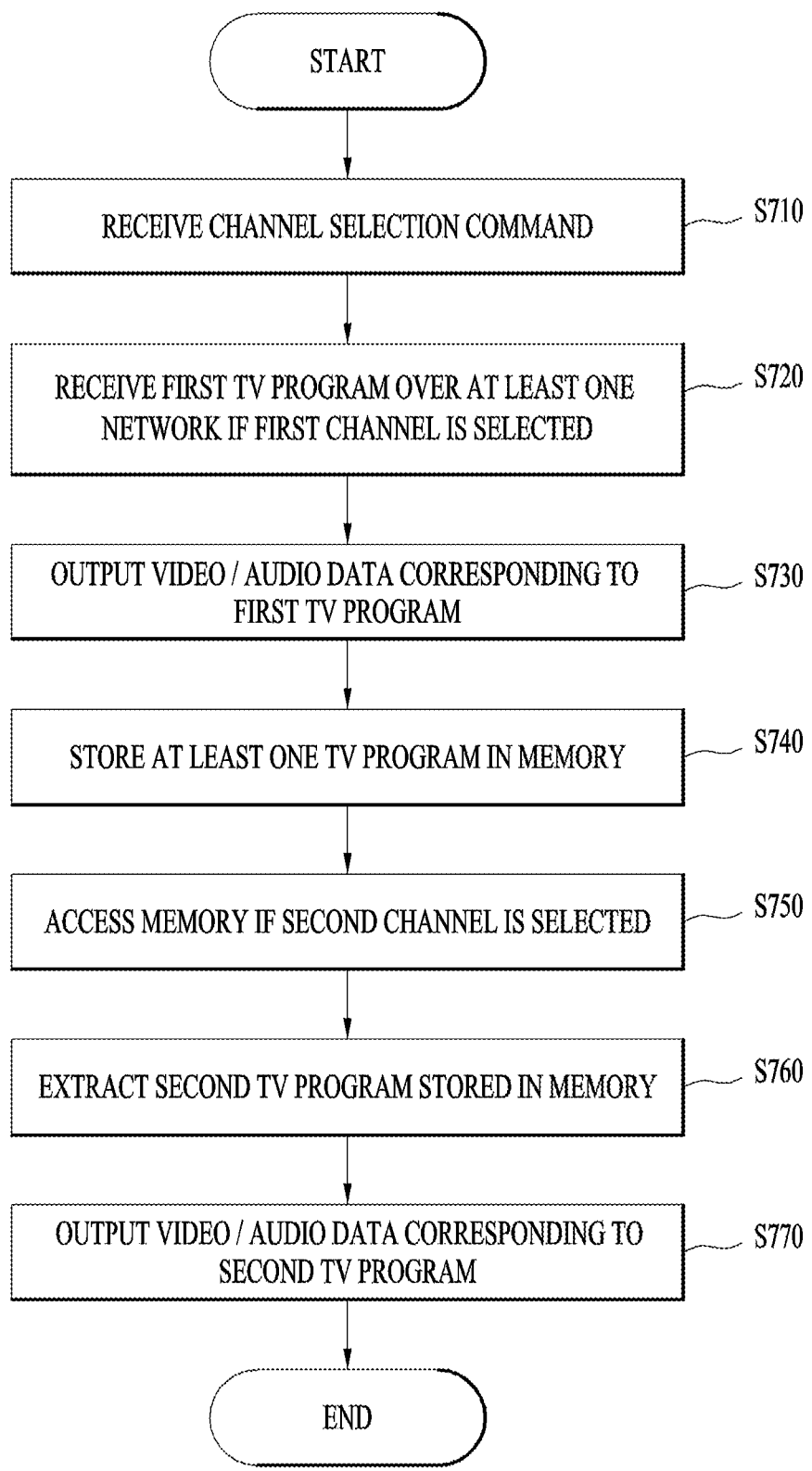
FIG. 7 is a flowchart showing a method for controlling a digital display device according to one embodiment of the present invention.

FIG. 7 is a flowchart showing a method for controlling a digital display device according to one embodiment of the present invention. FIG. 7 may be described with reference to FIG. 6.

The digital display device according to one embodiment of the present invention receives a channel selection command from the remote controller (S710).

If the first channel is selected, the first content (e.g., a TV program, etc.) is received over at least one network (S720) and video and audio data corresponding to the received first content (e.g., a TV program, etc.) is output (S730).

The digital display device stores at least one piece of content (e.g., a TV program, etc.) in an internal or external memory (S740). The content (e.g., a TV program, etc.) of step S740 corresponds to content received via a normal first channel, not via a specific virtual second channel.

Although step S740 is performed between step S730 and S750 in FIG. 7, at least one piece of content (e.g., a TV program, etc.) may be stored in the memory before performing step S710.

If the second channel is selected, the internal or external memory is accessed (S750), the second content (e.g., a TV program, etc.) stored in the accessed internal or external memory is extracted (S760) and video and audio data corresponding to the extracted second content (e.g., a TV program, etc.) is output (S770).

Although not shown in FIG. 7, if the second channel is selected, a step of displaying a list for identifying a plurality of pieces of content (e.g., a TV program, etc.) stored in the memory is further included. The plurality of pieces of content (e.g., a TV program, etc.) is not received from the second channel, for example.

Further, although not shown in FIG. 7, if output of the video and audio data corresponding to the second content (e.g., a TV program, etc.) is completed, a step of displaying supplementary information related to the second content (e.g., a TV program, etc.) is further included. The supplementary information may include at least one of broadcast schedule information and channel information of content (e.g., a TV program, etc.) related to the second content (e.g., a TV program, etc.), for example.

Although not shown in FIG. 7, if the second channel is selected, a step of temporarily stopping the network interface module is further included.

Figure 8:
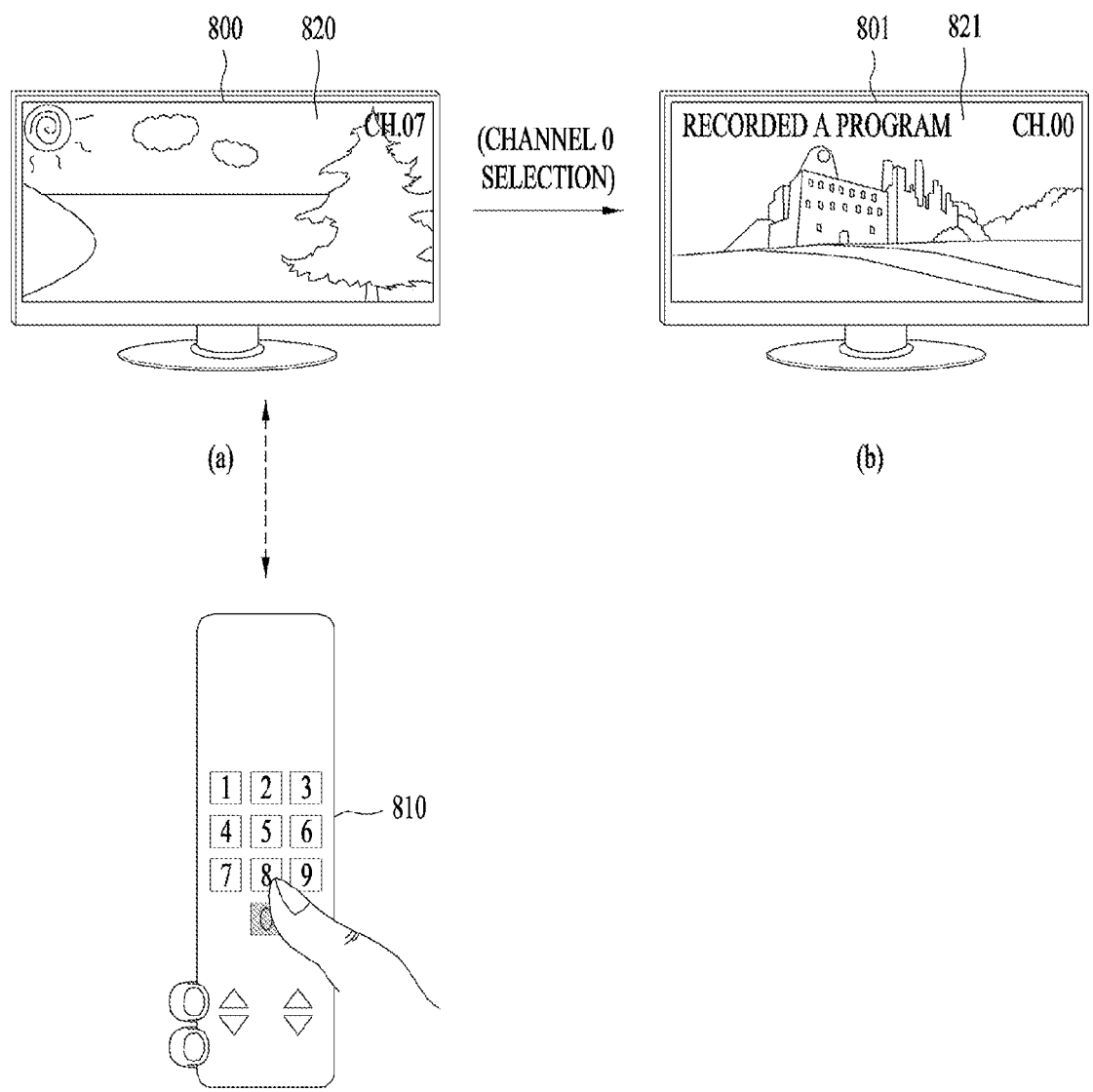
FIG. 8 is a diagram illustrating a channel change process of a digital display device according to one embodiment of the present invention.

FIG. 8 is a diagram illustrating a channel change process of a digital display device according to one embodiment of the present invention. Hereinafter, a channel change process of the digital display device according to one embodiment of the present invention will be described.

According to the related art, a channel is changed to only channel numbers provided by the broadcast station according to a channel up/down command. In contrast, according to one embodiment of the present invention, a technique of changing the channel to a specific virtual channel (e.g., a channel number 00) which is not provided by the broadcast station is defined.

As shown in FIG. 8a, the digital display device 800 outputs video data 820 provided by a broadcast station of a channel 7. At this time, assume that a channel 00 is selected using the remote controller 810. According to the related art, information indicating that a corresponding channel is not present is displayed.

In contrast, the digital display device 801 according to the embodiment of the present invention displays video data 821 corresponding to pre-stored content (e.g., a recorded program A), as shown in FIG. 8b.

Further, although the user directly enters a specific virtual channel number in FIG. 8, the channel may be changed to the specific virtual channel while the channel up/down command is received from the remote controller.

For example, according to the related art, if a channel down command is received in a state in which the channel is tuned to a lowest channel number 1, the channel is changed to a highest channel number. In contrast, according to the embodiment of the present invention, if a channel down command is received in a state in which the channel is tuned to a lowest channel number 1, the channel is changed to a specific virtual channel number, which provides pre-stored content or a list thereof independently of the broadcast station. Accordingly, it is possible to reduce the risk of automatically deleting pre-stored content in a state in which the user does not check the pre-stored content and to arouse user's interest by displaying the list of pre-stored content during channel change.

Figure 9:
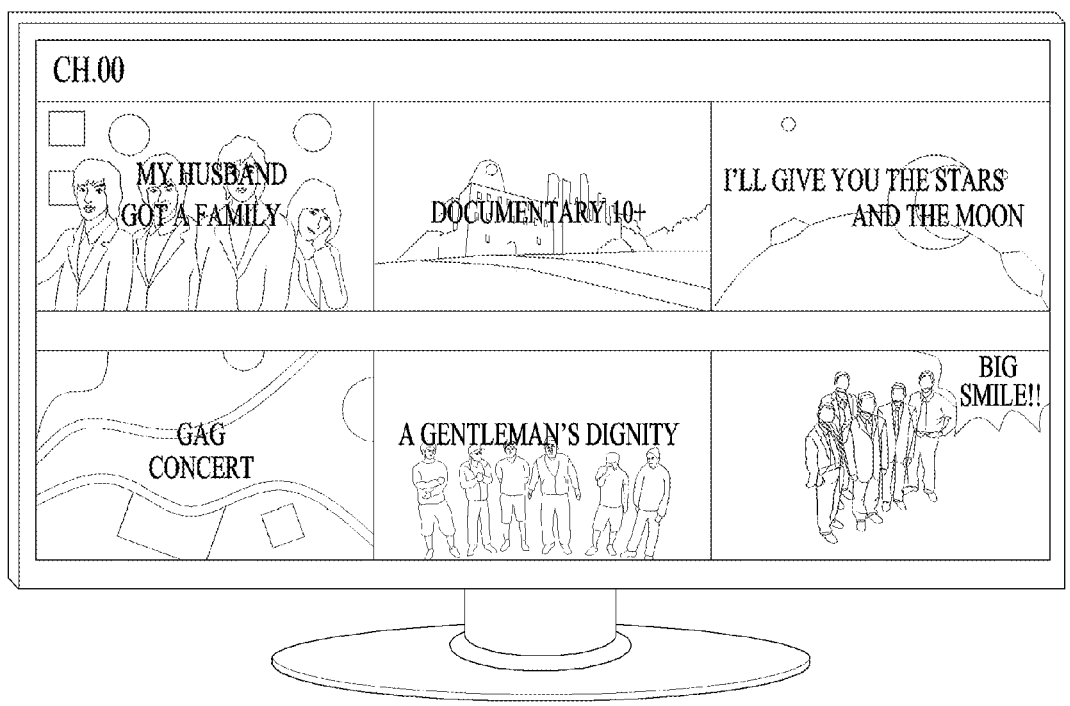
FIG. 9 is a diagram illustrating a specific channel provided through a digital display device according to one embodiment of the present invention.

FIG. 9 is a diagram illustrating a specific channel provided by a digital display device according to one embodiment of the present invention. Hereinafter, the specific channel provided by the digital display device according to one embodiment of the present invention will be described with reference to FIG. 9.

As shown in FIG. 8b, in one embodiment of the present invention, if a newly defined specific channel is selected, specific content among pre-stored content may be designed to be automatically displayed.

As shown in FIG. 9, in one embodiment of the present invention, if a newly defined specific channel is selected, a list for identifying a plurality of pieces of pre-stored content may be output.

Although only 6 pieces of recorded content are shown in FIG. 9, a list of more or less pieces of content may be displayed. Further, as shown in FIG. 9, the user may easily select desired specific content from among the plurality of pieces of pre-stored content.

In addition, unlike the related art, by employing a channel selection method without passing through several depths of a menu, it is possible to remarkably improve accessibility.

FIG. 10 is a diagram showing specific channel related data stored in a memory of a digital display device according to one embodiment of the present invention. Hereinafter, the specific channel related data stored in the memory of the digital display device according to one embodiment of the present invention will be described with reference to FIG. 10.

As described above, according to one embodiment of the present invention, one specific channel or a group of a plurality of specific channels may be designed independently of the broadcast station.

For example, as shown in FIG. 10, a channel number 00-1, which is independent of the broadcast station, provides pre-stored content belonging to a sports genre. Meanwhile, a channel number 00-2, which is in dependent of the broadcast station, provides pre-stored content belonging to a drama genre. In addition, a channel number 00-3, which is in dependent of the broadcast station, provides pre-stored content belonging to an entertainment genre.

Accordingly, pre-stored programs B, D and E shown in FIG. 10 belong to the sports genre, the pre-stored programs C and F belong to the drama genre and the pre-stored program A belongs to the entertainment genre.

In addition, if a plurality of pieces of content (e.g., a TV program, etc.) is stored in the memory, priority may be given to content (e.g., a TV program, etc.). For example, priority may be given in order of oldest to newest recorded content or in order of newest to oldest recorded content. Alternatively priority may be given based on other criteria as necessary or a user may directly change priority or set a priority criterion.

Although priority is set in the same genre in FIG. 10, if a single specific channel is configured independent of the broadcast station, priority may be given regardless of genre.

As described with reference to FIGS. 8b and 9, there are two embodiments of displaying a program when a specific channel is selected based on the database shown in FIG. 10.

If a user, who has performed channel surfing, selects a specific channel (channel number 00-1), the program D having highest priority is output (see FIG. 8b. In another embodiment, if a user, who has performed channel surfing, selects a specific channel (channel number 00-1), a list of pre-stored programs B, D and E is output (see FIG. 9).

Figure 11:
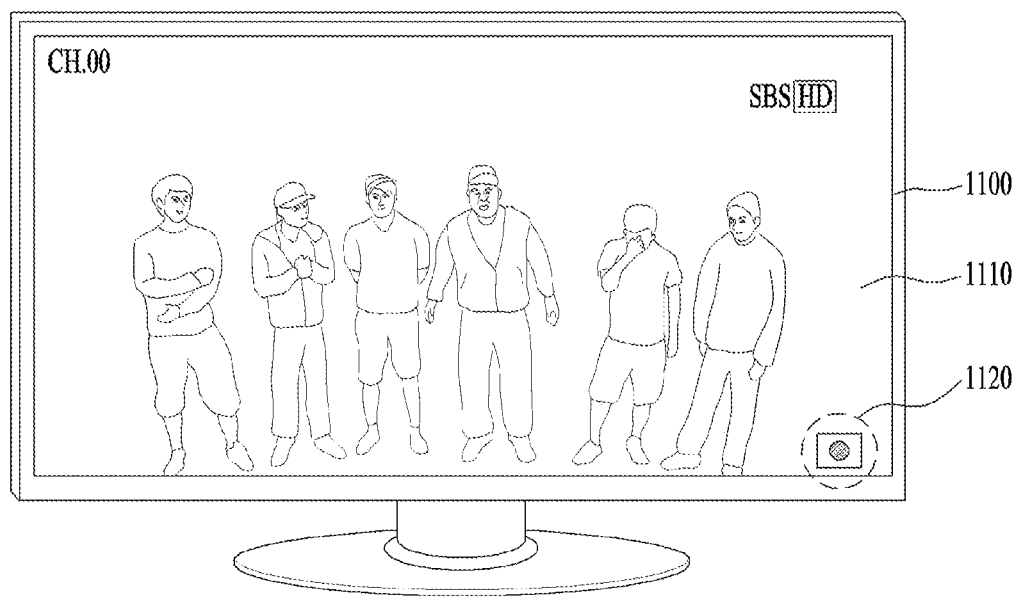
FIG. 11 is a diagram illustrating a process of automatically recording specific content by a digital display device according to one embodiment of the present invention.

FIG. 11 is a diagram illustrating a process of automatically recording specific content by a digital display device according to one embodiment of the present invention. Hereinafter, the process of automatically recording the specific content by the digital display device according to one embodiment of the present invention will be described with reference to FIG. 11.

A solution for providing pre-stored content (e.g., a TV program, etc.) upon entering a specific channel has been described with reference to the above-described drawings. Meanwhile, the content may be pre-stored via scheduled recording of a user or automatic recording of a digital display device. The automatic recording method will be described in greater detail with reference to FIGS. 18 to 26.

As shown in FIG. 11, the digital display device 110 records current content (e.g., a TV program, etc.) 1110 via an automatic or manual method. However, the user needs to be informed that the current content (e.g., a TV program, etc.) 1110 is being recorded according to memory capacity or change in user preference.

Accordingly, as shown in FIG. 11, an indicator 1120 indicating that the current content (e.g., a TV program, etc.) 1110 is being recorded is displayed on the lower right side of the screen, thereby minimizing obstruction of the user's view of the current content (e.g., a TV program, etc.). The user who checks the indicator 1120 may determine whether the current content (e.g., a TV program, etc.) 1110 is continuously recorded.

Figure 12:
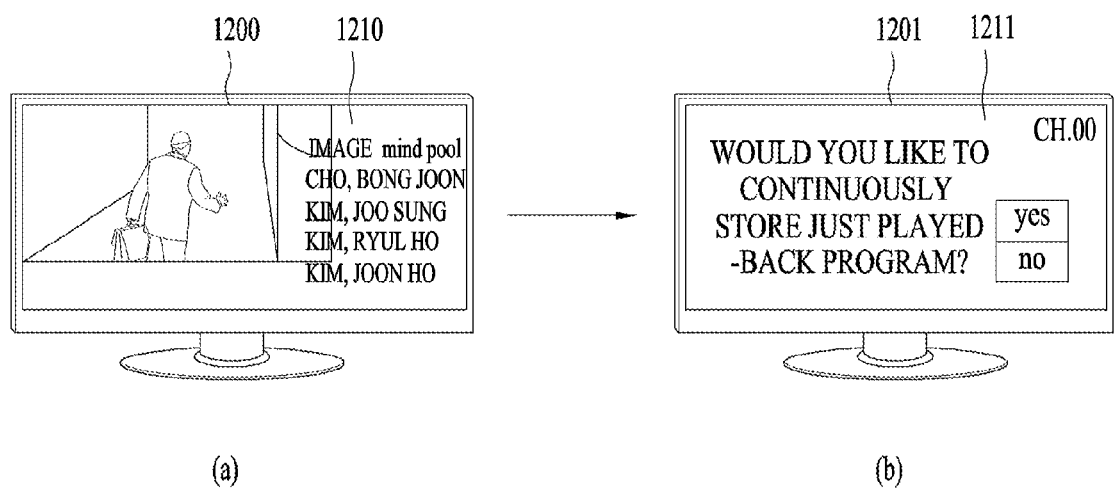
FIG. 12 is a diagram illustrating an example of a process of processing recorded content provided via a specific channel by a digital display device according to one embodiment of the present invention.

FIG. 12 is a diagram illustrating an example of a process of processing recorded content provided through a specific channel by a digital display device according to one embodiment of the present invention. Hereinafter, the process of processing the recorded content provided through the specific channel by the digital display device according to one embodiment of the present invention will be described with reference to FIG. 12.

As shown in FIG. 12a, the digital display device 1200 according to the embodiment of the present invention outputs pre-stored content (e.g., a TV program, etc.) 1210 through a specific channel (e.g., a channel number 00).

If playback of the content 1210 is completed, as shown in FIG. 9, the list of pre-stored content may be displayed. As shown in FIG. 12b, the digital display device 1201 outputs a message 1211 for asking whether the pre-stored content, which has been played back, is continuously stored.

Accordingly, it is possible to improve memory efficiency by deleting unnecessary data via the above-described message 1211.

Figure 13:
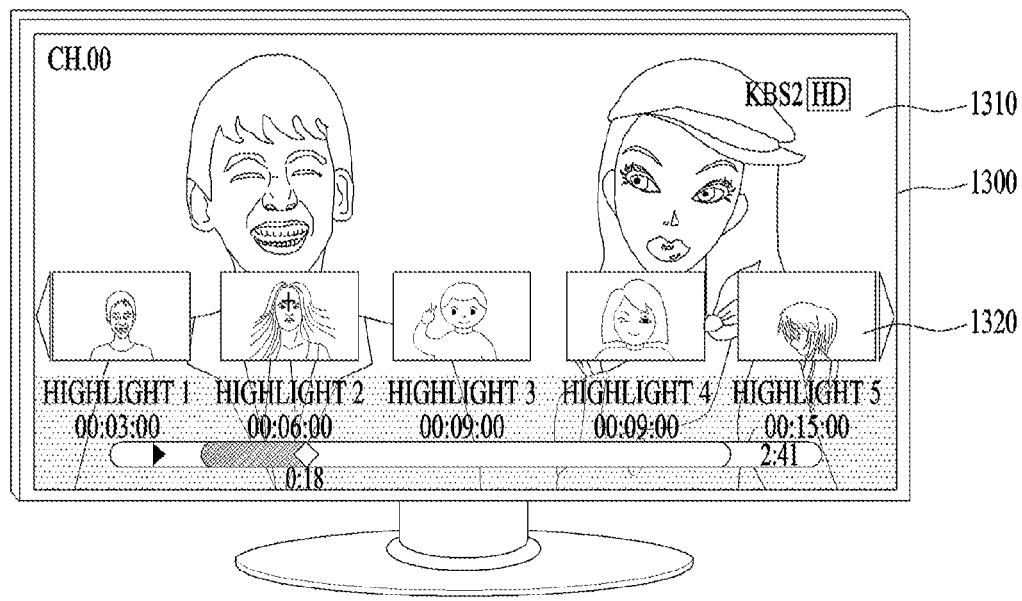
FIG. 13 is a diagram illustrating an example of a screen for outputting recorded content provided via a specific channel by a digital display device according to one embodiment of the present invention.

FIG. 13 is a diagram illustrating an example of a screen for outputting recorded content provided via a specific channel by a digital display device according to one embodiment of the present invention. Hereinafter, the example of the screen for outputting the recorded content provided via the specific channel by the digital display device according to one embodiment of the present invention will be described with reference to FIG. 13.

As shown in FIG. 13, the digital display device 1300 according to the embodiment of the present invention displays pre-stored content (e.g., a TV program, etc.) 1310 when entering a specific channel (channel number 00) which is independent of the broadcast station.

Further, thumbnail images 1320 of the pre-stored content are displayed on the lower side of the screen per unit time. Accordingly, the user may rapidly access a desired part to play the content back from that part. In addition, a progress bar may be further displayed on the lowest side of the screen.

Figure 14:
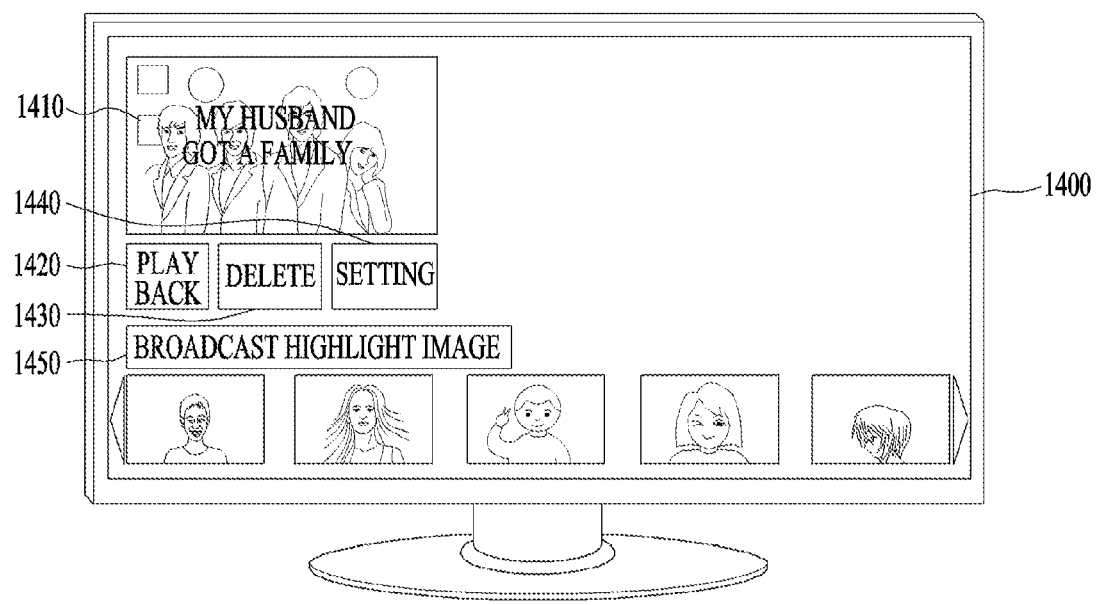
FIG. 14 is a diagram illustrating another example of a screen for outputting recorded content provided via a specific channel by a digital display device according to one embodiment of the present invention.

FIG. 14 is a diagram illustrating another example of a screen for outputting recorded content provided via a specific channel by a digital display device according to one embodiment of the present invention. Hereinafter, another example of the screen for outputting the recorded content provided via the specific channel by the digital display device according to one embodiment of the present invention will be described with reference to FIG. 14.

As shown in FIG. 14, the digital display device 1400 according to the embodiment of the present invention simultaneously or sequentially displays supplementary information related to the pre-stored content (e.g., a TV program, etc.) when entering a specific channel (a channel number 00) which is independent of the broadcast channel.

First supplementary information 1410 corresponds to video data representative of specific pre-stored content. In addition, second supplementary information 1420 corresponds to an option for playing specific pre-stored content back.

Third supplementary information 1430 corresponds to an option for deleting specific pre-stored content and fourth supplementary information 1440 corresponds to an option for setting specific pre-stored content.

Finally, fifth supplementary information 1450 corresponds to an option for playing a highlight of a moving image of specific pre-stored content. Accordingly, by displaying the above-described first to fifth supplementary information, the user can variously edit pre-stored content provided through a specific channel.

FIG. 15 is a diagram illustrating an example of editing playback of recorded content provided via a specific channel by a digital display device according to one embodiment of the present invention. Hereinafter, the example of editing playback of the recorded content provided via the specific channel by the digital display device according to one embodiment of the present invention will be described with reference to FIG. 15.

As shown in FIG. 15, the digital display device 1500 according to one embodiment of the present invention displays pre-stored content (e.g., a TV program, etc.) 1510 when entering a specific channel (a channel number 00) which is independent of the broadcast station.

Further, a progress bar 1520 indicating the playback status of the specific pre-stored content is displayed on the lower side of the screen. At this time, assume that the user presses a button corresponding to a right arrow for a predetermined period of time using the remote controller 1530.

Accordingly, as shown in the right side of FIG. 15, the digital display device 1501 outputs the moved screen for a predetermined period of time. In comparison between the right and left sides of FIG. 15, it can be seen that the progress bar moves to the right by 1 minute. That is, the progress bar 1520 indicates 37 minutes as the playback state of the specific pre-stored content and video data 1510 is output before user input is received using the remote controller and the progress bar 1521 indicates 38 minutes as the playback state of the specific pre-stored content and video data 1511 is output after user input is received using the remote controller.

FIG. 16 is a diagram illustrating another example of editing playback of recorded content provided via a specific channel by a digital display device according to one embodiment of the present invention. Hereinafter, another example of editing playback of the recorded content provided via the specific channel by the digital display device according to one embodiment of the present invention will be described with reference to FIG. 16.

As shown in FIG. 16, the digital display device 1600 according to one embodiment of the present invention displays pre-stored content (e.g., a TV program, etc.) 1610 upon entering a specific channel (a channel number 00) which is independent of the broadcast station).

Further, a progress bar 1620 indicating the playback status of the specific pre-stored content is displayed on the lower side of the screen. At this time, assume that the user touches a button corresponding to a right arrow twice using the remote controller 1630. While the progress bar is adjusted in proportion to time in FIG. 15, the progress bar is adjusted in proportion to the number of times of touch in FIG. 16, both of which are within the scope of the present invention.

Accordingly, as shown in the right side of FIG. 16, the digital display device 1601 outputs the moved screen for a predetermined period of time. In comparison between the right and left sides of FIG. 16, it can be seen that the progress bar moves to the right by 1 minute. That is, the progress bar 1620 indicates 37 minutes as the playback state of the specific pre-stored content and video data 1610 is output before user input is received using the remote controller and the progress bar 1621 indicates 38 minutes as the playback state of the specific pre-stored content and video data 1611 is output after user input is received using the remote controller.

Figure 17:
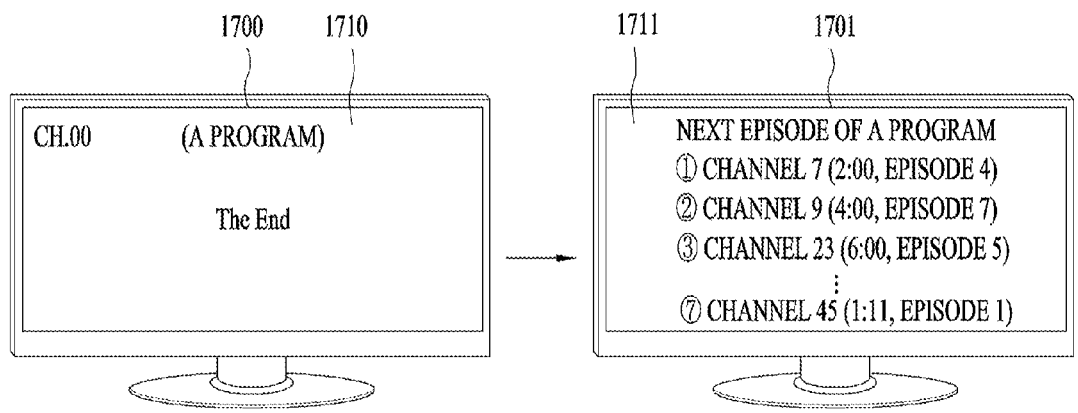
FIG. 17 is a diagram illustrating another example of a process of processing recorded content provided via a specific channel by a digital display device according to one embodiment of the present invention.

FIG. 17 is a diagram illustrating another example of a process of processing recorded content provided via a specific channel by a digital display device according to one embodiment of the present invention. Hereinafter, another example of the process of processing the recorded content provided via the specific channel by the digital display device according to one embodiment of the present invention will be described with reference to FIG. 17.

The digital display device 1700 according to one embodiment of the present invention outputs pre-stored content when entering a specific channel and the digital display device 1701 changes the screen to a screen for displaying related supplementary information 1711 if playback of the content 1710 is completed.

For example, supplementary information corresponding to pre-stored content, playback of which is completed, is extracted using electronic program guide (EPG) information. More particularly, for example, if the A program, playback of which is completed, corresponds to episode 3, a message indicating a channel number and time for providing a broadcast program of a next episode is generated and output. Information about a broadcast program of a previous episode may be provided.

In FIGS. 1 to 17, the specific virtual channel number which is independent of the broadcast station has been described. The specific channel number serves to provide information about pre-stored content. As described above, the content provided by the specific channel number may be manually stored by the user or may be automatically stored. Hereinafter, in FIGS. 18 to 26, a technique of automatically storing the content provided by the specific channel number will be described with reference to FIGS. 18 to 26. Further, although one embodiment of the present invention described with reference to FIGS. 1 to 17 and another embodiment of the present invention described with respect to FIGS. 18 to 26 are distinguishably described, it will be apparent to those skilled in the art that another embodiment may be implemented by combining one embodiment and another embodiment of the present invention as necessary.

Figure 18:
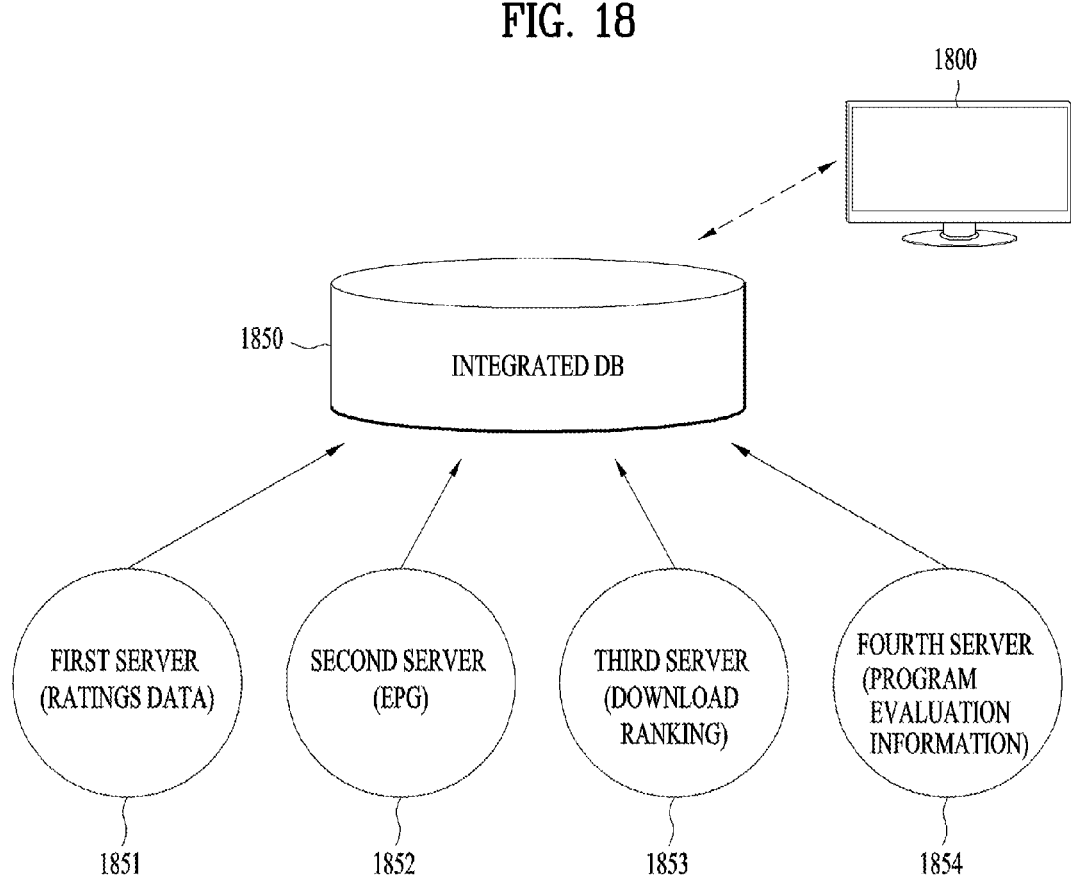
FIG. 18 is a diagram showing an integrated database connected via a network to a digital display device according to another embodiment of the present invention.

FIG. 18 is a diagram showing an integrated database connected via a network to a digital display device according to another embodiment of the present invention.

As shown in FIG. 18, the display device 1800 according to another embodiment of the present invention is connected to an integrated database 1850 over a network. Alternatively, a separate server for managing the integrated database 1850 may be established.

Further, the integrated database 1850 is designed to perform data communication with at least one of a first server 1851, a second server 1852, a third server 1853 and a fourth server 1854.

The first server 1851 collects ratings data of content (e.g., a TV program, etc.) via a broadcast station or a website, the second server 1852 collects data regarding content (e.g., a TV program, etc.) and a broadcast time of each channel, the third server 1853 collects data regarding ranking of content (e.g., a TV program, etc.) or download ranking of content, and the fourth server 1854 collects content (e.g., a TV program, etc.) and evaluation information of content. The evaluation information may be collected via various social network services (SNSs), for example.

Accordingly, the integrated database 1850 or the digital display device 1800 may determine priority of content (e.g., a TV program, etc.) using a variety of data provided by the first to fourth servers. Automatic recording of content (e.g., a TV program, etc.) is performed according to priority and information about automatically recorded content (e.g., a TV program, etc.) is provided via the above-described specific channel (a channel number 00).

FIG. 19 is a block diagram showing a digital display device according to another embodiment of the present invention. Hereinafter, the digital display device according to another embodiment of the present invention will be described with reference to FIG. 19.

The digital display device 1900 connected to at least one network and at least one memory includes a main controller 1910, a memory controller 1920, a screen 1930, a speaker 1940, a network interface module 1950, a memory interface module 1960, a calculation module 1970 and a remote controller interface module 1980. Some of the modules shown in FIG. 19 may be deleted or other modules may be added to the components shown in FIG. 19 and the scope of the present invention should be interpreted according to the scope of the claims.

The network interface module 1950 receives content (e.g., a TV program, etc.) via at least one network. The memory interface module 1960 performs data communication with an external memory 1961.

The calculation module 1970 calculates memory capacity of the internal memory and the external memory 1961 is calculated and the main controller 1910 stores the received content (e.g., a TV program, etc.) in the internal or external memory 1961 according to the calculated result.

The remote controller interface module 1980 receives a channel selection command from the remote controller 1981 and the memory controller 1920 accesses the internal or external memory 1961 if a specific channel is selected using the remote controller interface module 1980.

The screen 1930 outputs video data corresponding to the content (e.g., a TV program, etc.) stored in the accessed internal or external memory 1961 and the speaker 1940 outputs audio data corresponding to the content (e.g., a TV program) stored in the accessed internal or external memory 1961.

The network interface module 1950 is designed to receive ratings or download ranking related data from at least two servers. For example, related data is received via the first server 1851 and the third server 1853 shown in FIG. 18.

Further, for example, based on the data, at least one factor of a maximum number of pieces of content (e.g., a TV program, etc.) to be stored, a maximum allowable number of pieces of series content to be stored or a storage period of stored content (e.g., a TV program, etc.) is automatically determined. This will be described in greater detail with reference to FIGS. 23 and 24.

The calculation module 1970 is designed to adjust at least one factor according to the memory capacity of the internal memory or the external memory 1961. Further, this will be described in greater detail with reference to FIG. 26.

The specific channel is independent of a channel provided by a broadcast station or a content provider (CP). More particularly, for example, the specific channel corresponds to the channel 00 described with reference to FIGS. 1 to 17.

FIG. 20 is a flowchart illustrating a method for controlling a digital display device according to another embodiment of the present invention. Hereinafter, the method for controlling the digital display device according to another embodiment of the present invention will be described with reference to FIG. 20. Some of steps shown in FIG. 20 may be deleted or other steps may be added, without departing from the scope of the present invention.

The digital display device connected to at least one network and at least one memory receives content (e.g., a TV program, etc.) over the at least one network (S2010).

The digital display device calculates memory capacity of the internal or external memory (S2020) and stores the received content (e.g., a TV program, etc.) in the internal or external memory according to the calculated result (S2030).

If a specific channel is selected, the digital display device accesses the internal or external memory (S2040) and extracts the content (e.g., a TV program, etc.) stored in the accessed internal or external memory (S2050).

The digital display device is designed to output video data and audio data corresponding to the extracted content (e.g., a TV program, etc.) (S2060).

Although not shown in FIG. 20, a step of receiving ratings or download ranking related data from at least two servers over at least one network may be further included.

The calculating step S2020 is designed to determine at least one factor of a maximum number of pieces of content (e.g., a TV program, etc.), a maximum allowable number of pieces of series content to be stored or a storage period of stored content (e.g., a TV program, etc.) based on the data.

The calculating step S2020 is designed to include a step of adjusting the at least one factor according to the calculated memory capacity of the internal or external memory.

FIG. 21 is a diagram showing supplementary information of specific content stored in an integrated database according to another embodiment of the present invention. Hereinafter, the supplementary information of the specific content stored in the integrated database according to another embodiment of the present invention will be described with reference to FIG. 21.

Ratings ranking and download ranking shown in FIG. 21 are received from an external server. Assume that a ratings score and a download score are not received from the external server.

At this time, the ratings score Y is determined by an equation "Y=101−(ratings ranking) and the download score Z is determined by an equation "Z=101−(download ranking).

Accordingly, as shown in FIG. 21, the ratings score of specific content (e.g., a TV program, etc. such as Secret Garden) is 100 and the download score thereof is 89. Here, the lower the ranking or the higher the score, the higher the priority. In addition, the higher the priority, the higher the probability that the content is automatically stored.

FIG. 22 is a diagram showing a plurality of pieces of content-related supplementary information stored in an integrated database according to another embodiment of the present invention. Hereinafter, the plurality of pieces of content-related supplementary information stored in the integrated database according to another embodiment of the present invention will be described with reference to FIG. 22.

If the ranking is converted into a score according to the method described with reference to FIG. 21, as shown in FIG. 22, it is possible to calculate a ratings score and a download score of all content (e.g., a TV program, etc.).

Further, in FIG. 22, each of the ratings score and the download score has a minimum value (min) and a maximum value (max). The minimum value and the maximum value may mean an error range or correspond to the case in which a plurality of servers for providing a ratings ranking and download ranking is present.

As shown in FIG. 22, a final value considering the "download score and ratings score" is distinguished from the ranking of the ratings score or the ranking of the download score. In another embodiment of the present invention, for example, both the download score and the ratings score are considered.

This is because, if the ratings of specific content (e.g., a TV program, etc.) is high but the number of downloads of the specific content is small, an arbitrary user does not wish to store the specific content (e.g., a TV program) and, if the ratings of specific content (e.g., a TV program, etc.) is low but the number of downloads of the specific content is large, an arbitrary user does not wish to store the specific content (e.g., a TV program). Accordingly, both factors (ratings and the number of downloads) need to be considered in order to more accurately estimate user preference.

Figures 23, 24:
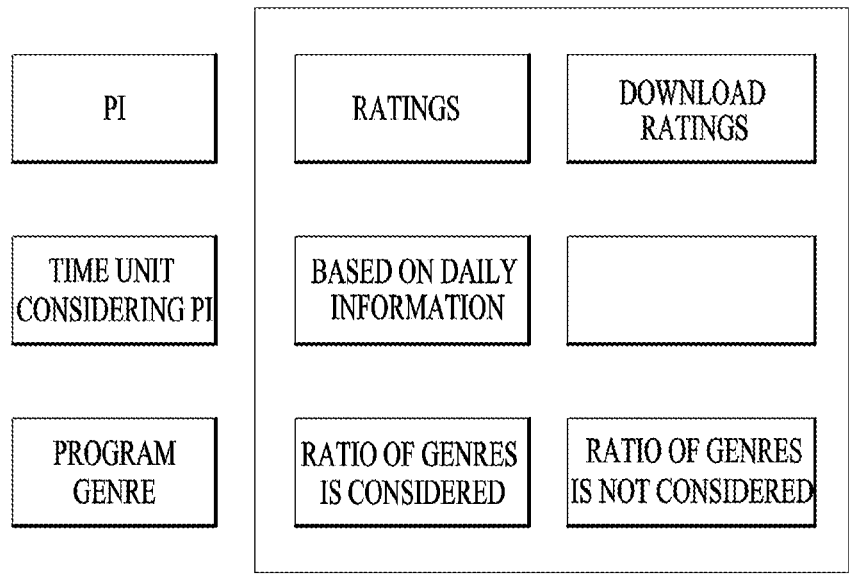
FIG. 23 is a diagram showing one or more factors for selecting content automatically stored by a digital display device according to another embodiment of the present invention.
FIG. 24 is a diagram showing a final selection criterion of content automatically stored by a digital display device according to another embodiment of the present invention.

FIG. 23 is a diagram showing one or more factors for selecting content automatically stored by a digital display device according to another embodiment of the present invention. Hereinafter, one or more factors for selecting the content automatically stored by the digital display device according to another embodiment of the present invention will be described with reference to FIG. 23.

As described with reference to FIGS. 21 and 22, according to another embodiment of the present invention, two factors (ratings and the number of downloads) are used as a popularity index (PI). Accordingly, it is possible to more accurately estimate user preference.

Further, as shown in FIG. 23, according to another embodiment of the present invention, a time unit and a genre of content (e.g., a TV program, etc.) are considered in addition to the PI.

For example, the PI collected from the server is calculated in the unit of days or weeks. In addition, genre filtering of a plurality of pieces of content (e.g., a TV program, etc.) having high priority may or may not be performed using electronic program guide (EPG) information. Genre filtering may be performed by a user or may be automatically performed by default.

More specifically, for example, a plurality of pieces of content may be extracted from content having high priority per genre (category) or content may be automatically recorded in descending order of priority (e.g., a TV program) regardless of genre (category).

FIG. 24 is a diagram showing a final selection criterion of a content automatically stored by a digital display device according to another embodiment of the present invention. Hereinafter, the final selection criterion of the content automatically stored by the digital display device according to another embodiment of the present invention will be described with reference to FIG. 24.

Assume that ratings and download ranking are used as a PI for selecting content (e.g., a TV program, etc.) for automatic recording. The present invention may be implemented using other supplementary information.

Since the memory capacity of the digital display device is restricted, a maximum number of pieces of recorded content is restricted to 6. Further, although the genre of the recoded content (e.g., a TV program, etc.) is restricted to drama, entertainment or current affairs/education (experimental preference order), other genres may be added or the above-described genres may be deleted.

Further, a maximum allowable number of series is restricted to 1. Since automatic recording of the same series is not preferable in terms of user preference, the maximum allowable number of series is one. However, manual recording of series by a user is possible.

In addition, since the automatically recorded content (e.g., a TV program, etc.) may not be continuously stored due to limitation of memory capacity, the stored content (e.g., a TV program, etc.) is stored only during four days. The storage time may be changed according to editing of the user.

The time unit considering the PI is updated based on only daily information. Accordingly, it is possible to immediately apply change in ratings and the number of downloads.

Although only the internal memory is present in the table shown in FIG. 24, the numerals shown in FIG. 24 may be suitably and automatically updated depending on whether the external memory is connected and the capacity of the external memory, which will be described in greater detail with reference to FIG. 26.

Figures 25, 26:
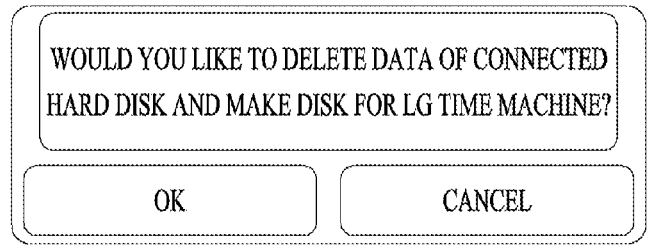
FIG. 25 is a diagram showing a graphical user interface (GUI) output if a digital display device according to another embodiment of the present invention is connected to an external memory.
FIG. 26 is a diagram showing a database for automatically updating the final selection criterion shown in FIG. 24 according to external memory connection status and type by a digital display device according to another embodiment of the present invention.

FIG. 25 is a diagram showing a graphical user interface (GUI) output if a digital display device according to another embodiment of the present invention is connected to an external memory. Hereinafter, the graphical user interface (GUI) output if the digital display device according to another embodiment of the present invention is connected to the external memory will be described with reference to FIG. 25.

Recently, with technological development, the capacity of the internal memory attached to a TV has been increased. However, it is difficult for a general user to arbitrarily increase the capacity of the internal memory. Accordingly, in another embodiment of the present invention, an interface used by easily connecting an external memory is proposed.

If the external memory is connected to the digital display device according to another embodiment of the present invention, as shown in FIG. 25, a guide message is automatically generated and output.

Accordingly, the user does not need to separately manage an address for managing automatically recorded content (e.g., a TV program, etc.). In addition, content (e.g., a TV program, etc.) may be automatically recorded regardless of the capacity of the internal memory.

Although not shown, the automatically recorded content (e.g., a TV program, etc.) may be automatically transmitted to an external device instead of the external memory.

FIG. 26 is a diagram showing a database for automatically updating the final selection criterion shown in FIG. 24 according to external memory connection status and type by a digital display device according to another embodiment of the present invention. Hereinafter, the database for automatically updating the final selection criterion shown in FIG. 24 according external memory connection status and type by the digital display device according to another embodiment of the present invention will be described with reference to FIG. 26.

As described with reference to FIG. 24, if the external memory is not connected, the maximum number of pieces of recorded content (e.g., a TV program, etc.) is restricted to 6, the maximum allowable number of series is 1, and the maximum number of days for storing content (e.g., a TV program, etc.) is restricted to 4.

However, as shown in FIG. 19, in case of a device including an interface for connecting an external memory, a technique of automatically optimizing the numerals is necessary.

For example, if an external memory (10 GB) is connected, the maximum number of pieces of recorded content (e.g., a TV program, etc.) is extended to 6, the maximum allowable number of series is 1, and the maximum number of days for storing content (e.g., a TV program, etc.) is extended to 5.

For example, if an external memory (20 GB) is connected, the maximum number of pieces of recorded content (e.g., a TV program, etc.) is extended to 12, the maximum allowable number of series is 2, and the maximum number of days for storing content (e.g., a TV program, etc.) is extended to 6.

For example, if an external memory (50 GB) is connected, the maximum number of pieces of recorded content (e.g., a TV program, etc.) is extended to 21, the maximum allowable number of series is 3, and the maximum number of days for storing content (e.g., a TV program, etc.) is extended to 7.

Although not shown in FIG. 26, a GUI for specifying the location of the stored content (e.g., a TV program, etc.) in the internal memory or the external memory may be output.

FIGS. 27 and 28 are diagrams illustrating an example of a channel change process according to another embodiment of the present invention.

As described above, when a specific fixed channel number is selected by a user, a list of pre-stored content may be displayed. In order to increase user accessibility, a list of pre-stored content may be displayed in a channel zapping process.

For example, as shown in FIG. 27, a receiver (TV or STB) may pre-recognize information about channels 1, 2, 4, 5 and 7 based on EPG information. That is, Channel 3 and Channel 6 are not used by broadcast stations.

Accordingly, as shown in FIG. 28, the channels (e.g., Channel 3 (2801) and Channel 6 (2802)) which are not currently used are used as time machine channels defined by the present invention. When the time machine channel is selected, a list of pre-stored content is automatically displayed as described above. According to the related art, if a user who has viewed Channel 2 selects a channel up command, the channel is moved to Channel 4.

Figure 29:
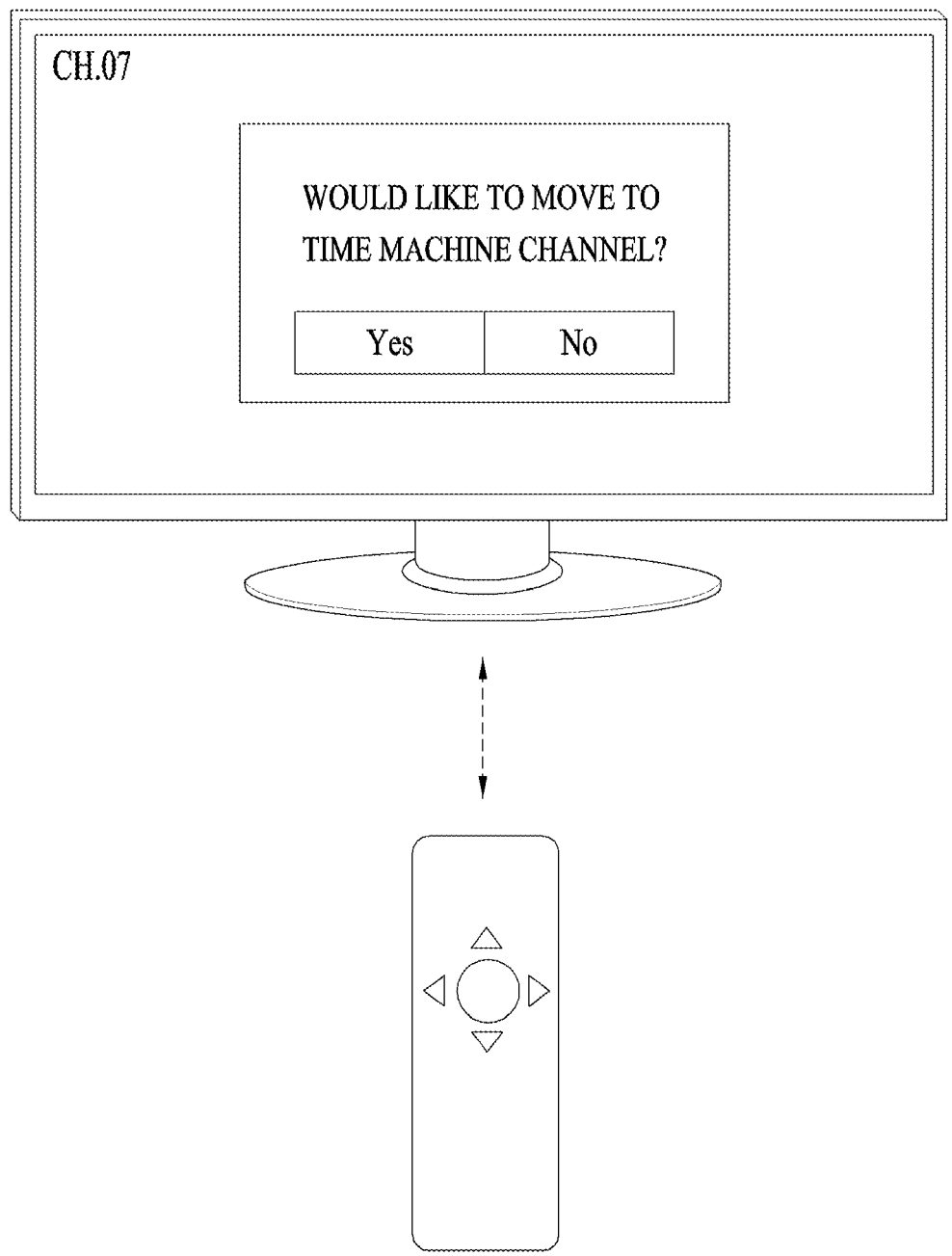

FIGS. 29 and 30 are diagrams illustrating another example of a channel change process according to another embodiment of the present invention.

Further, a user who first uses a receiver (TV or STB) to which the present invention is applied needs to recognize information about automatic tuning of the time machine channel. For example, an on screen display (OSD) shown in FIG. 29 may be output before channel change to provide an option to the user. Alternatively, the process shown in FIG. 29 may be omitted.

A user who does not have preference for a specific channel repeats a channel zapping process. For example, the receiver may continuously receive a channel number or an up/down command. A solution for solving such a situation is shown in FIG. 30.

First, the receiver (TV or STB) receives a channel change command from the remote controller (S3010). At least one of the number of commands for continuously changing the channel or an interval between the commands is calculated (S3020).

Whether a predetermined condition is satisfied is determined (S3030). For example, if the number of commands for changing the channel is 3 or more and the interval between the commands is 0.5 seconds or less, the user may be regarded as not preferring a specific channel. The above-described numerals are only exemplary and may be changed by those skilled in the art.

If the predetermined condition is not satisfied, the channel is normally changed based on the command for changing the channel (S3060).

If the predetermined condition is satisfied, an OSD for asking whether the channel is moved to a time machine channel (e.g., 00 channel or empty channel) is displayed (S3040). For example, the process shown in FIG. 29 is used. If the user determines that the channel is moved to the time machine channel, the channel is moved to the time machine channel (S3050). The step S3040 may be omitted.

The device and the method for controlling the same according to one embodiment of the present invention may be implemented as other embodiments by combining the above-described drawings or matters well known to those skilled in the art.

According to one embodiment of the present invention, it is possible to shorten a time for accessing pre-stored content (e.g., content such as a TV program, etc.) and to improve a data processing speed. In addition, it is possible to provide a solution for maximizing user convenience.

According to another embodiment of the present invention, it is possible to provide a database for more efficiently managing pre-stored content (e.g., content such as a TV program, etc.). Further, it is possible to provide a technique of optimizing a storage list of preferred content of a user according to the status of an internal memory and an external memory.

The display device and the method of controlling the same according to the foregoing embodiments may be implemented as code that can be written to a computer-readable recording medium and can thus be read by a processor. The computer-readable recording medium may be any type of recording device in which data can be stored in a computer-readable manner. Examples of the computer-readable recording medium include a ROM, a RAM, a CD-ROM, a magnetic tape, a floppy disk, an optical data storage, and a carrier wave (e.g., data transmission over the Internet). The computer-readable recording medium can be distributed over a plurality of computer systems connected to a network so that computer-readable code is written thereto and executed therefrom in a decentralized manner. Functional programs, code, and code segments needed to realize the embodiments herein can be construed by one of ordinary skill in the art.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A digital display device connected to at least one memory, the digital display device comprising:
   a network interface module configured to receive content from one or more external servers;
   a memory interface module configured to perform data communication with an external memory;
   a calculation module configured to calculate memory capacity of an internal memory and the external memory;
   a main controller configured to store the received content in the internal or external memory according to the calculated result;
   a remote controller interface module configured to receive one or more channel selection commands from a remote controller;
   a memory controller configured to access the internal or external memory;
   a screen configured to output video data corresponding to the content in response to the received one or more channel selection commands,
   wherein the main controller controls the screen to output an on screen display (OSD) message for asking whether to move to a specific channel, if at least one of a number of the channel selection commands for continuously changing the channel or an interval between the channel selection commands is more than a predetermined number or less than a predetermined interval,
   wherein the main controller further controls the screen to output video data corresponding to the content stored in the accessed internal or external memory, and
   wherein a channel number among channel numbers which are not assigned to a broadcasting channel is assigned to the specific channel.

2. The digital display device according to claim 1, wherein the network interface module is configured to receive ratings data or download ranking related data from the one or more external servers.

3. The digital display device according to claim 2, wherein at least one factor of a maximum number of pieces of content to be stored, a maximum allowable number of pieces of series content to be stored or a storage period of stored content is automatically determined based on the ranking data or the download ranking related data.

4. The digital display device according to claim 3, wherein the calculation module is configured to adjust the at least one factor according to the calculated memory capacity of the internal or external memory.

5. The digital display device according to claim 1, wherein the specific channel is independent of a channel provided by a broadcast station or a content provider, CP.

6. The digital display device according to claim 1, wherein the digital display device corresponds to an Internet Protocol Television (IPTV), a smart TV or a set-top box (STB).

7. The digital display device according to claim 1, wherein the screen is configured to output a list of contents stored in the internal or external memory in a channel zapping process by a user.

8. The digital display device according to claim 1, wherein the screen is further configured to output supplementary information related to the content after a completion of reproducing the video data corresponding to the content stored in the accessed internal or external memory.

9. The digital display device according to claim 8, wherein the additional information related to the content includes at least one of broadcast schedule information and channel information of content related to the content.

10. A method for controlling a digital display device connected to at least one memory, the method comprising:
   receiving, at a network interface module, content from one or more external servers;
   calculating, at a calculation module, memory capacity of an internal or external memory;
   storing, by a main controller, the received content in the internal or external memory according to the calculated result;
   receiving at a remote controller interface module, one or more channel selection commands;
   accessing, at a memory controller, the internal or external memory;
   extracting, by the memory controller, the content stored in the accessed internal or external memory; and
   outputting, at a screen, video data and audio data corresponding to the extracted content in response to the received one or more channel selection commands,
   wherein the main controller controls the screen to output an on screen display (OSD) message for asking whether to move to a specific channel, if at least one of a number of the channel selection commands for continuously changing the channel or an interval between the channel selection commands is more than a predetermined number or less than a predetermined interval,
   wherein the main controller further controls the screen to output video data corresponding to the content stored in the accessed internal or external memory, and wherein a channel number among channel numbers which are not assigned to a broadcasting channel is assigned to the specific channel.

11. The method according to claim 10, further comprising receiving ratings data or download ranking related data from the one or more external servers.

12. The method according to claim 11, wherein the calculating further includes determining at least one factor of a maximum number of pieces of content to be stored, a maximum allowable number of pieces of series content to be stored or a storage period of stored content based on the ranking data or the download ranking related data.

13. The method according to claim 12, wherein the calculating further includes adjusting the at least one factor according to the calculated memory capacity of the internal or external memory.

14. The method according to claim 10, wherein the specific channel is independent of a channel provided by a broadcast station or a content provider (CP).

15. The method according to claim 10, further comprises outputting a list of contents stored in the internal or external memory in a channel zapping process by a user.

16. The method according to claim 10, further comprises outputting supplementary information related to the content after a completion of reproducing the video data corresponding to the content stored in the accessed internal or external memory.

17. The method according to claim 16, wherein the additional information related to the content includes at least one of broadcast schedule information and channel information of content related to the content.

* * * * *